United States Patent
Lewis et al.

(10) Patent No.: US 10,168,165 B2
(45) Date of Patent: Jan. 1, 2019

(54) DRIVER GUIDANCE FOR GUIDED MANEUVERING

(71) Applicant: Modular Mining Systems, Inc., Tucson, AZ (US)

(72) Inventors: Michael W. Lewis, Tucson, AZ (US); Lucas Van Latum, Tucson, AZ (US); Andree Röttig, Tucson, AZ (US); William Casson, Tucson, AZ (US)

(73) Assignee: Modular Mining Systems, Inc., Tucson, AZ (US)

( * ) Notice: Subject to any disclaimer, the term of this patent is extended or adjusted under 35 U.S.C. 154(b) by 0 days.

(21) Appl. No.: 15/787,445

(22) Filed: Oct. 18, 2017

(65) Prior Publication Data

US 2018/0038702 A1 Feb. 8, 2018

Related U.S. Application Data

(60) Continuation of application No. 15/094,225, filed on Apr. 8, 2016, now Pat. No. 9,823,082, which is a continuation-in-part of application No. 14/745,269, filed on Jun. 19, 2015, now Pat. No. 9,562,784, which is a continuation of application No. 14/052,543, filed
(Continued)

(51) Int. Cl.
*G01C 21/34* (2006.01)
*G07C 5/08* (2006.01)
(Continued)

(52) U.S. Cl.
CPC ..... *G01C 21/3407* (2013.01); *G01C 21/3461* (2013.01); *G01S 19/48* (2013.01); *G05D 1/0278* (2013.01); *G07C 5/0816* (2013.01); *G07C 5/0841* (2013.01); *G08G 1/0962* (2013.01); *G08G 1/096716* (2013.01); *G08G 1/096725* (2013.01); *G08G 1/096741* (2013.01); *G08G 1/096775* (2013.01); *G01S 19/14* (2013.01); *G05D 2201/021* (2013.01)

(58) Field of Classification Search
CPC ........... G01C 21/3407; G01C 21/3461; G08G 1/096741; G08G 1/096775; G08G 1/096716; G08G 1/096725; G08G 1/0962; G01S 19/48; G05D 1/0278; G05D 2201/021; G07C 5/0841
See application file for complete search history.

(56) References Cited

U.S. PATENT DOCUMENTS

| | | | | |
|---|---|---|---|---|
| 2002/0165649 | A1* | 11/2002 | Wilhelm Rekow | A01B 69/008 701/26 |
| 2002/0188400 | A1* | 12/2002 | Sato | G01C 21/3415 701/455 |

(Continued)

*Primary Examiner* — Rodney A Butler
(74) *Attorney, Agent, or Firm* — Quarles & Brady LLP

(57) ABSTRACT

A system and method for driver guidance are presented. A position sensor is mounted to a vehicle. The position sensor is configured to identify a position of the vehicle and a heading of the vehicle. A device is configured to generate a plurality of outputs. A controller is connected to the position sensor and the display device. The controller is configured to access, via a wireless communications network, a database to identify a target loading location for the vehicle, determine a location and a heading of the target loading location for the vehicle, and modify at least one of the plurality of outputs of the display device based upon at least one of the location and the heading of the target loading location.

15 Claims, 19 Drawing Sheets

Related U.S. Application Data on Oct. 11, 2013, now Pat. No. 9,157,754, which is a division of application No. 13/217,113, filed on Aug. 24, 2011, now Pat. No. 8,583,361.

(51) Int. Cl.
    *G01S 19/48*     (2010.01)
    *G08G 1/09*     (2006.01)
    *G05D 1/02*     (2006.01)
    *G08G 1/0962*     (2006.01)
    *G08G 1/0967*     (2006.01)
    *G01S 19/14*     (2010.01)

(56) References Cited

U.S. PATENT DOCUMENTS

| | | | | |
|---|---|---|---|---|
| 2005/0143905 A1* | 6/2005 | Yoshikawa | ........ | G01C 21/3617 701/424 |
| 2005/0172230 A1* | 8/2005 | Burk | ........ | G06F 3/0482 715/716 |
| 2009/0079839 A1* | 3/2009 | Fischer | ........ | G01S 7/003 348/218.1 |
| 2009/0140887 A1* | 6/2009 | Breed | ........ | G01C 21/165 340/990 |
| 2010/0106356 A1* | 4/2010 | Trepagnier | ........ | G01S 17/023 701/25 |
| 2010/0191446 A1* | 7/2010 | McDonald | ........ | F02N 11/0837 701/113 |
| 2011/0112730 A1* | 5/2011 | Rekow | ........ | G05D 1/0219 701/50 |
| 2012/0179325 A1* | 7/2012 | Faenger | ........ | B60K 35/00 701/31.4 |
| 2012/0271540 A1* | 10/2012 | Miksa | ........ | G01C 21/30 701/409 |
| 2013/0127638 A1* | 5/2013 | Harrison | ........ | G08G 1/166 340/903 |

* cited by examiner

DRIVER GUIDANCE FOR GUIDED MANEUVERING

CROSS-REFERENCE TO RELATED APPLICATION

This application is a continuation of and incorporates by reference U.S. patent application Ser. No. 15/094,225 entitled "DRIVER GUIDANCE FOR GUIDED MANEUVERING" and filed on Apr. 8, 2016, which is a continuation-in-part of and incorporates by reference U.S. patent application Ser. No. 14/745,269 entitled "GUIDED NAVIGATION OF A MINING VEHICLE" and filed on Jun. 19, 2015, which is a continuation of and incorporates by reference U.S. patent application Ser. No. 14/052,543 entitled "GUIDED MANEUVERING OF A MINING VEHICLE TO A TARGET DESTINATION" and filed on Oct. 11, 2013, which is a divisional application of and incorporates by reference U.S. patent application Ser. No. 13/217,113 entitled "GUIDED MANEUVERING OF A MINING VEHICLE TO A TARGET DESTINATION" and filed on Aug. 24, 2011.

FIELD OF THE INVENTION

This disclosure is related to systems and methods for providing automated guidance directions to operators of heavy equipment, and specifically, to a system and method for providing guidance maneuvering assistance to heavy equipment operators in proximity with other heavy equipment, hazards, or geographical features.

BACKGROUND OF THE INVENTION

Mining environments, particularly open pit surface mining environments, present unique challenges to maintaining safe operation of vehicles. The workhorse of a modern surface mine is a mine haul truck, which is a dump truck capable of hauling up to four hundred, and in some cases over four hundred, tons of material. Haul trucks are some of the largest land vehicles ever built. As such, they are characterized by limited maneuverability, relatively slow acceleration and deceleration, and poor sight lines on every side of the vehicle. In particular, the rear and side opposite to the operator's cabin of a mine-haul truck present enormous blind spots for the haul truck operator.

Within a mining environment there may be many other vehicles such as shovels, dozers, bucket wheel excavators, or other equipment that are each similarly difficult to control. Because the vehicles are so large, they can have large blind spots, large turning radii, and slow braking capabilities, making navigating the vehicles to a given destination extremely difficult. In many cases, though, by accurately positioning these vehicles in proximity to other vehicles or geographical features of the mine, the mine's efficiency can be greatly improved. Additionally, through accurate navigation, dangers of injury or property damage resulting from a collision can be mitigated.

In one example of conventional pit mining operations, material is blasted from a face, picked up by a shovel, and loaded into the bed of a haul truck. The haul truck then moves the material to a crusher for processing. Shovels can be several times larger than a haul truck. A typical electric shovel can measure 100 feet in length from the rear of the crawler portion to the end of the bucket. The overall height of the shovel can measure 70 feet with a typical bucket height of 45 feet. A typical distance from the center of rotation of a shovel to the distal end of the bucket is 80 feet.

Haul truck loading tends to be a rate limiting operation in the material extraction process of a mine. Conventionally, a haul truck will back up along a path that is perpendicular to a face positioned on one side of the shovel. Once the truck is in position beside the shovel, the shovel operator will retrieve material from the face and load the truck. Once loaded, the truck proceeds to a crusher. Given the size and responsiveness of a conventional mine truck, the process of navigating a truck into a desired position can take some time. Additionally, a collision between a mine haul truck and a shovel or other mining equipment can be catastrophic resulting in not only injury or death, but in millions of dollars in equipment damage and downtime. Accordingly, mine-haul truck drivers tend to be tentative when moving their vehicles into position for loading, further reducing the vehicle's efficiency.

Ideally, as a first truck is being loaded on a first side of a shovel, a second truck will move into position on the other side. This maximizes the use of the shovel, allowing it to be continuously engaged in the loading operation, rather than waiting for the next truck to move into position.

FIG. 1 shows a conventional solution for assisting a mine-haul truck to navigate into a loading area besides a shovel. In the arrangement of FIG. 1, power shovel 105 is working at a mine face 102. Power shovel 105 includes lower assembly 110. Lower assembly 110 includes first and second crawler tread 115a, and 115b. Power shovel 105 includes an upper assembly 120, which is rotationally coupled to lower assembly 110 via a rotational bearing 125. Upper assembly 120 includes boom 127. Attached to boom 127 at a hinge is a handle 130. At a distal end of handle 130 is a bucket 135. Upper assembly 120 also includes a cab 140 in which an operator of power shovel 105 resides. In the example operation shown in FIG. 1, power shovel 105 is electrically powered via dragline tether 145 which provides electrical energy to shovel 105. Other shovels, such as hydraulic shovels, may not be powered via a dragline tether or power cable and instead can operate independently. In either case, the upper assembly of a shovel often presents a large structure extending rearwards away from the shovel's cab. As the shovel rotates, both the boom and rear portion of the upper assembly can pose a hazard to nearby objects as it rotates about the shovel's rotational bearing. Because the shovel and upper assembly must enclose additional power generation machinery, the upper assembly of a hydraulic digger that does not rely on a dragline for power generally extends further in a rearward direction from the shovel's cab.

The conventional arrangement of FIG. 1 shows a first mine haul truck 150 in position to receive material from shovel 105. During the loading of first haul truck 150, however, shovel 105 is rotating back and forth between the first loading position and the face 102. As such, second haul truck 165, which would otherwise be positioned on the opposite side of power shovel 105 from first haul truck 150, must keep clear of the arc of the tale and corners of the upper assembly 120 while loading is occurring at the first loading position. The dangers inherent in backing a haul truck up to an operating shovel often cause truck operators to delay moving into position until the bucket of the shovel is already positioned over the second loading position. This results in wasteful downtime.

The conventional solution to this problem is to attach a boom 155 ending in a highly visible marker 160 to the tail of the shovel 105. Occasionally, power line markers or traffic cones are used for the highly visible marker 160. Conventionally, the operator of the second truck 165 will use the highly visible marker 160 to align the second truck 165 while the first truck is being loaded. After loading of the first truck 150 is complete, and the shovel rotates the bucket back to the face 102 to pick up more material, the second truck 165 backs into position.

Systems have been developed that track the location of mine haul trucks with respect to potential hazards. For example, co-owned U.S. Patent Application Publication No. 2009/0062971 discloses a GPS based system for defining routes and potential hazards in a mining environment. Co-owned U.S. Pat. No. 6,799,100 discloses a permission system for controlling interaction between autonomous vehicles in a mining environment, U.S. Pat. No. 6,487,500 B2 to Lemelson et al., describes a system that uses GPS systems on vehicles, augmented by more accurate position sensors, to alert a vehicle operator of hazards in the operator's vicinity, including other vehicles. U.S. Pat. No. 7,047,114 B1 to Rogers et al., describes a hazard warning system for marine vessels. The Rogers system takes GPS position and data information from marine vessels and forwards that information to those vessels hazard alerts based on the positions of other vessels as well as fixed and semi-fixed hazards derived from nautical charts.

SUMMARY OF THE INVENTION

Embodiments of the invention provide for using GPS and other geolocation technology to guide operators of mine haul trucks into position at a mining facility. Specifically, embodiments of the invention use position tracking and guidance systems to assist an operator of a mining vehicle, or to control directly an autonomous vehicle, in positioning a vehicle at a predetermined location with respect to another mining vehicle or a particular geographical feature.

In accordance with one aspect of the present disclosure, a system includes a position sensor mounted to a vehicle, the position sensor being configured to identify a position of the vehicle and a heading of the vehicle, a display device configured to generate a plurality of visual outputs, and a controller connected to the position sensor and the display device. The controller is configured to access, via a wireless communications network, a database to identify a target loading location for the vehicle, determine a location and a heading of the target loading location for the vehicle, compare the position of the vehicle to the location of the target loading location to determine a location offset, compare the heading of the vehicle to the heading of the target loading location to determine a heading offset, and modify at least one of the plurality of visual outputs of the display device based upon at least one of the location offset and the heading offset.

In another embodiment, a system includes a position sensor mounted to a vehicle, the position sensor being configured to identify a position of the vehicle and a heading of the vehicle, an output device configured to generate a plurality of outputs, and a controller connected to the position sensor and the output device. The controller is configured to access, via a wireless communications network, a database to identify a target loading location for the vehicle, determine a location and a heading of the target loading location for the vehicle, and modify at least one of the plurality of outputs of the output device based upon at least one of the location and the heading of the target loading location.

In another embodiment, a method includes accessing, via a wireless communications network, a database to identify a target loading location for a vehicle. The vehicle includes a position sensor mounted to a vehicle. The position sensor is configured to identify a position of the vehicle and a heading of the vehicle. The method includes determining a location and a heading of the target loading location for the vehicle, comparing the position of the vehicle to the location of the target loading location to determine a location offset, comparing the heading of the vehicle to the heading of the target loading location to determine a heading offset, and generating an output on a display device based upon at least one of the location offset and the heading offset.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Figure 1:
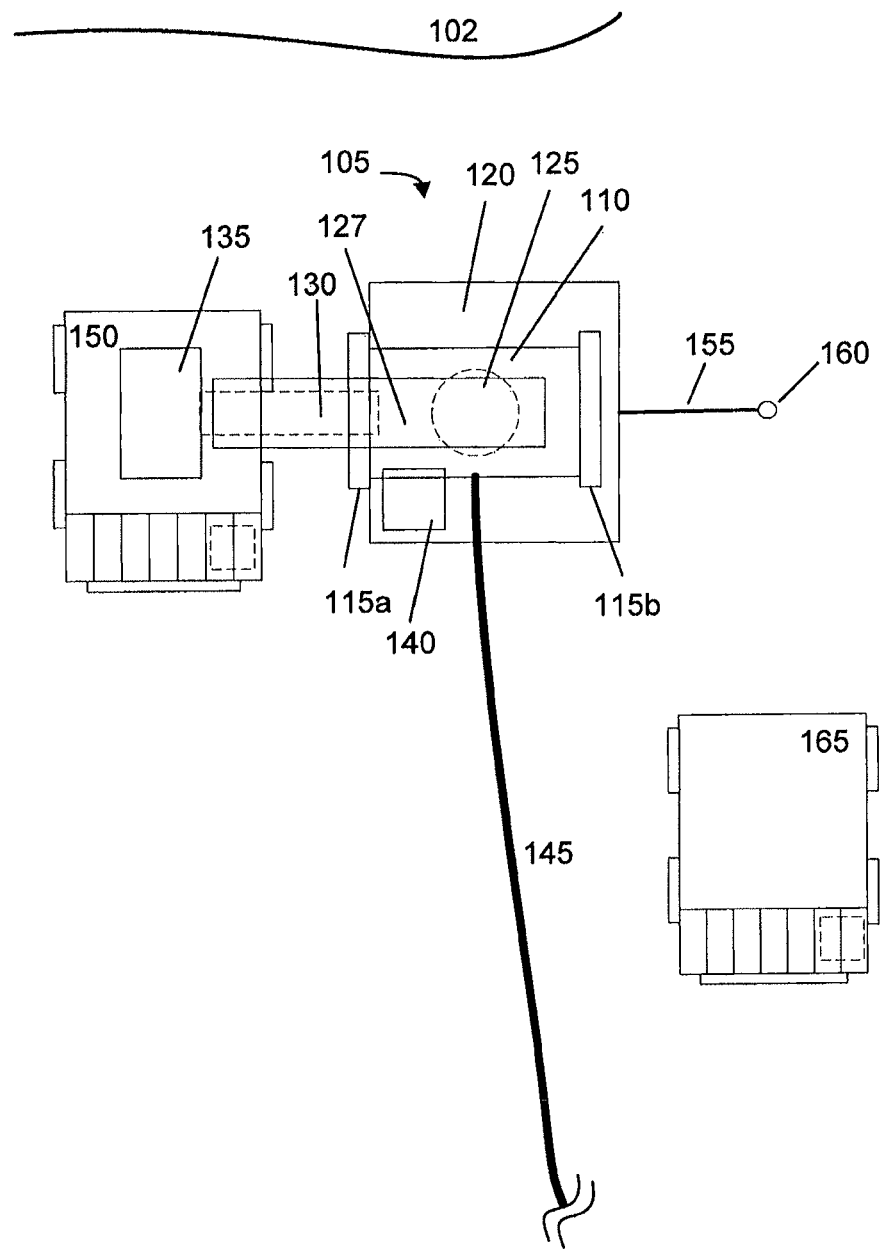
FIG. 1 is a diagram illustrating a conventional arrangement for guiding haul trucks into a loading position.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for example, comprise one or more physical or logical blocks of computer instructions which may, for example, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Where, "data storage media," or "computer readable media" is used, Applicants mean an information storage medium in combination with the hardware, firmware, and/or software, needed to write information to, and read information from, that information storage medium. In certain embodiments, the information storage medium comprises a magnetic information storage medium, such as and without limitation, a magnetic disk, magnetic tape, and the like. In certain embodiments, the information storage medium comprises an optical information storage medium, such as and without limitation, a CD, DVD (Digital Versatile Disk), HD-DVD (High Definition DVD), BD (Blue-Ray Disk) and the like. In certain embodiments, the information storage medium comprises an electronic information storage medium, such as and without limitation, a PROM, EPROM, EEPROM, Flash PROM, compactflash, smartmedia, and the like. In certain embodiments, the information storage medium comprises a holographic information storage medium.

Reference is made throughout this specification to "signals." Signals can be any time varying electromagnetic waveform, whether or not encoded with recoverable information. Signals, within the scope of this specification, can be modulated, or not, according to any modulation or encoding scheme. Additionally, any Fourier component of a signal, or combination of Fourier components, should be considered itself a signal as that term is used throughout this specification.

The present system facilitates the navigation of a mining vehicle or other heavy equipment such as a haul truck, shovel, dozer, or excavator to a desired target destination. The system first generates a listing of target destinations. The target destinations may include static sites such as parking areas or repair facilities. In other cases, the targets are moveable as they may be defined by changing geographical features or may be defined by the position of another vehicle. An operator of the vehicle selects the intended target destination and the present system calculates a most appropriate path to the target destination. In other implementations, a supervisory controller selects the intended target. The supervisory controller may be implemented via an automated decision-making software system or an individual acting in a supervisory capacity. The path is selected to optimize efficiency for navigating the vehicle to the target destination, but can also be optimized for safety. In other implementations, the path may also be optimized for various factors defined on a case-by-case basis. Other factors, for example, could include operator experience, operator training requirements, or other characteristics of the operator or the vehicle. After determining the path, the present system generates a display or other output that demonstrates the path to the vehicle operator. As the vehicle navigates along the path, the present system provides constant feedback to ensure the operator is following the selected path.

Figure 2:
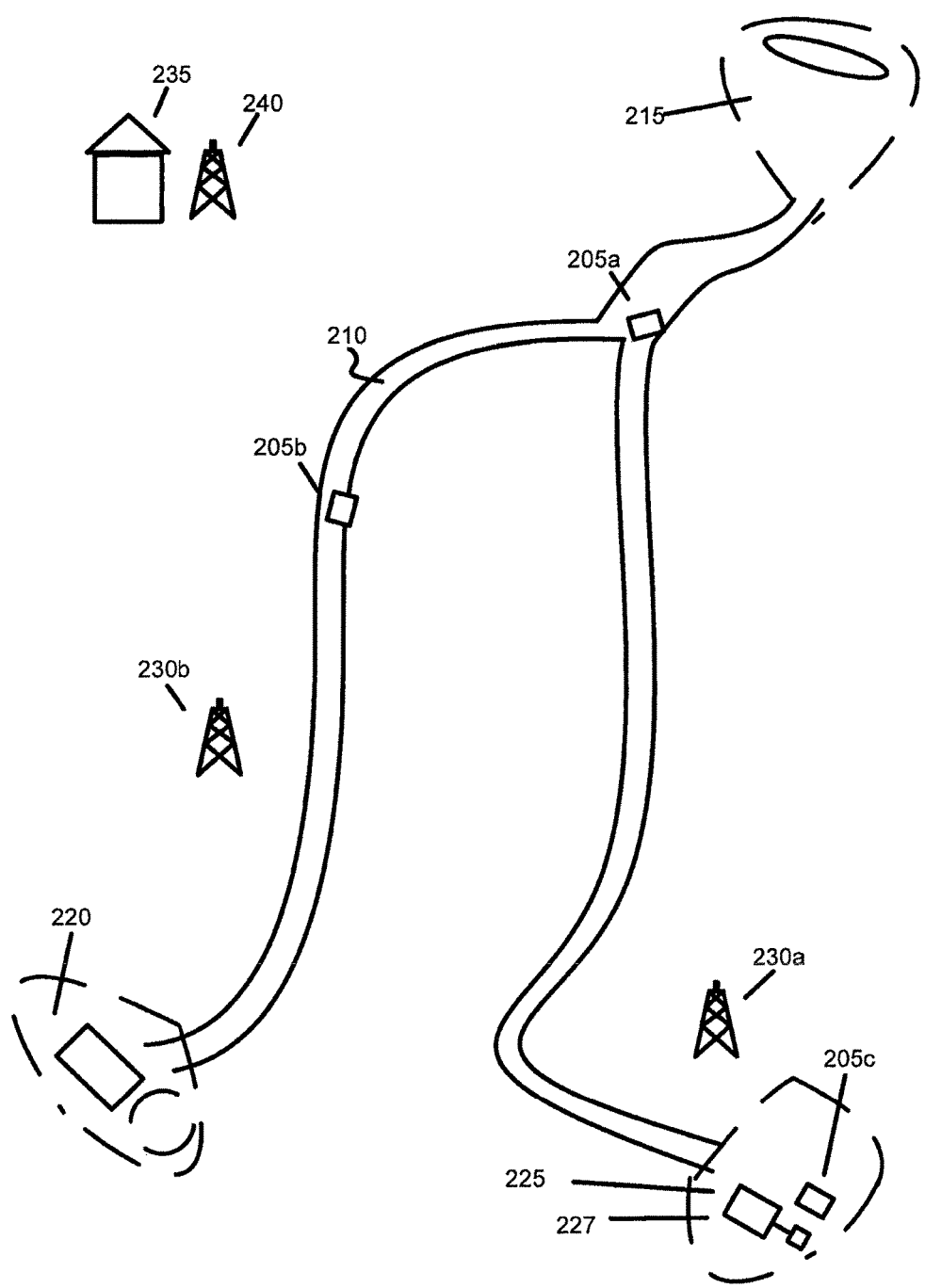
FIG. 2 is a schematic diagram of an open pit mining environment with a networked data collection and transmission system according to an embodiment of the invention.

FIG. 2 is an illustration of an open pit mining environment where systems and methods according to embodiments of the invention are implemented. In the environment of FIG. 2, a plurality of mine haul trucks 205a-c operate on a mine haul route network 210. Mine haul trucks 205a-c perform hauling tasks, for example, by moving material between a shovel site 225 a crusher site 220 and a dump or stockpile site 215.

Each mine haul truck 205a-c is equipped with an array of navigation, communication, and data gathering equipment that assist the haul truck's operator. Each mine haul truck is equipped with a mobile computing device, for example, a tablet personal computer, a personal digital assistant, or a "smart phone" for implementing the present system. The mobile computing device includes the basic functionality common to all computing devices, specifically, data processing, storage, input and output devices like displays, speakers and either dedicated or on-screen keyboards, and network communications interfaces. The mobile computing device and its functionality are discussed in greater detail below with respect to FIG. 3.

Each mine haul truck's mobile computing device is configured to receive data from a Global Positioning System receiver, which generates information about the time-varying position of the truck. Additionally, or alternatively, each mine truck's mobile computing unit receives data from a geolocation receiver, which generates information about the time-varying position of the truck based on transmissions from transmitters located terrestrially, within the mining environment. The mobile computing device may also communicate with on-board sensors such as gyroscopes or inertial navigation systems for locating the haul truck within the mine environment.

Each mine haul truck's mobile computing device operates in communication with a transceiver, which exchanges data directly with other mine haul trucks and with a mine communications network 230a, 230b, and 240. In FIG. 2, the mine communications network is represented as a collection of wireless data transceivers, such as would be suitable in implementing a WiFi 802.11g or 802.11n, WiMax, GPRS, EDGE or equivalent network. These network architecture examples, however, are not limiting.

In practice, a mine communications network is typically an ad-hoc network consisting of various wired and wireless portions. The distances over which communications may occur in a mining environment, combined with the challenging and ever-changing topography of a mine, often prevent using strictly WiFi transceivers. The wireless portions of a mine communications network may not always be implemented using contemporary standards, and may include slower legacy systems. The only requirement for a mine communications network is that it allow for, at least, the sharing of data between a central mine management computer located at a central site 235, with a plurality of mine haul trucks 205a-c. In certain embodiments, central site 235 includes a central communications node 240 and a central computing device, for example, the device discussed below with respect to FIG. 3. In certain embodiments, transceivers located at the mine haul trucks 205a-c can act as network peers and may share information with one another directly, without the need to be in direct communication with the wider mine communications network.

In the embodiment of FIG. 2, power shovel 227 has a mobile computing device in communication with the communications network over a transceiver located at power shovel 227. The mobile computing device, which performs functions similar to those performed by the mobile computing devices located at mine haul trucks 205a-c, is at least adapted to communicate the position of the power shovel 227 to a central mine management application.

Figure 3:
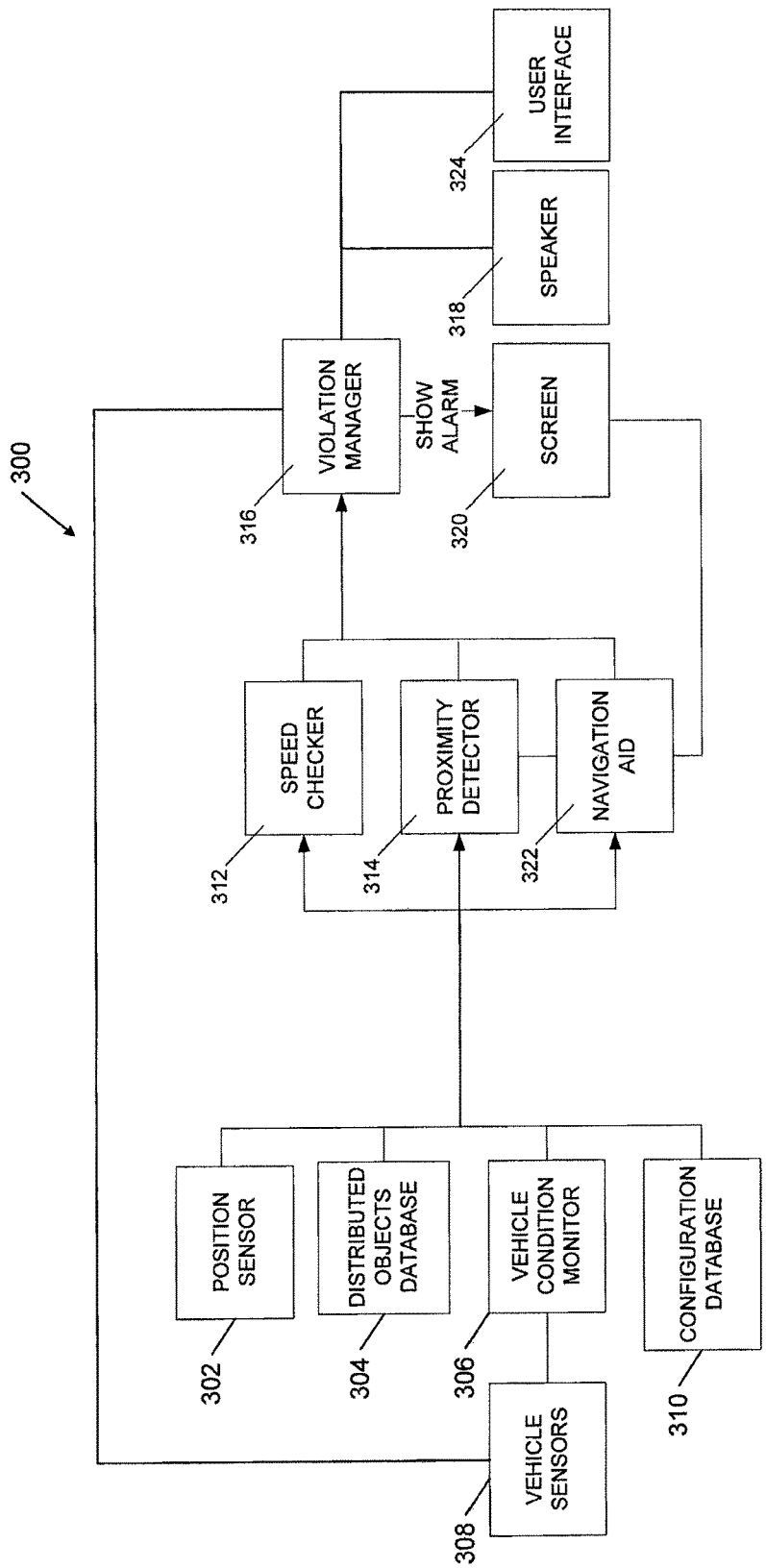
FIG. 3 is a functional block diagram showing the components of a navigation system running on a mobile computing device located at a vehicle according to an embodiment of the invention.

FIG. 3 is a diagram illustrating functional components of the present system for aiding navigation of a vehicle to a particular target destination. The system includes a number of sensors, databases (either locally accessible or accessed via a wireless electronic communications network), and processing elements. The system is configured to generate a listing of candidate target destinations for the vehicle. The target destinations may include fixed locations such as parking spaces, crusher locations, repair facilities, fueling facilities, or dump sites. The target destinations may also include movable targets, though, such as moving faces within the mining environment, moving vehicles, or moving roadways, for example. In some cases, the target destinations are themselves defined by the positions of other objects. For example, a number of target destinations may be defined around the perimeter of a shovel—for example at each side of the shovel, or may be defined based upon the position of other vehicles.

After generating the listing of candidate target destinations, a user, supervisor, or supervisory controller system selects a particular destination and, after verifying that the destination is valid, the system generates a path to the destination. The system can use characteristics of the vehicle, driver (including, for example, criteria for evaluating when the equipment has exceeded, or will exceed, its acceptable operational limits), and known hazards and boundaries within the mining environment to calculate the most appropriate path. To select a particular path, a number of candidate paths can be generated. The paths are then ranked based upon one or more criteria (e.g., safety, efficiency, or simplicity) and the best path is selected.

After selecting the best path to the selected target destination, the present system is configured to monitor a movement of the vehicle along that path and provide constant feedback to an operator of the vehicle (either human or a computer system in the case of an autonomous vehicle). The constant feedback allows for errors in the path of the vehicle to be corrected. If, however, the vehicle navigates to a position where it is impossible or extremely difficult for the vehicle to return to the selected path (e.g., it would exceed the vehicle's operational limits for the vehicle to do so), the present system can be configured to abort the current path and calculate a new, replacement path to the selected destination.

One or more components of the system can be mounted within the vehicle. In various implementations, though, one or more of the systems (e.g., the various databases) may be installed at a central location of the mine where they may be updated and monitored by a central computing system. Generally, the components of the system shown in FIG. 3 may be installed directly into the heavy equipment vehicle and in direct communication with one another, or, if configured at a location away from the vehicle, the components are in wireless communication with the vehicle and components mounted therein. In other implementations, to provide redundancy, one or more of the systems illustrated in FIG. 3 may be duplicated in both the heavy equipment vehicle and an offsite location, for example, to provide redundancy.

In FIG. 3 system 300 includes a position sensor 302. The position sensor 302 detects the position of the vehicle, for example, by triangulating the vehicle's position in relation to fixed satellites, such as is known in GPS related art. The position sensor 302 might also determine the position of the vehicle by other means such as by triangulating the vehicle's position in relation to terrestrial transmitters located in a mining environment. In certain embodiments, WiFi or WiMax network transceivers with fixed, known positions may be used to provide terrestrial points of reference. The position sensor 302 optionally can use a combination of methods or systems to determine position, for example, by determining a rough position using GPS and performing error correction by terrestrial references, such as broadcasting beacons mounted in and around the mining environment or other terrestrial reference points. In alternative embodiments, position sensor 302 also takes data from conventional RFID, RADAR, optical or other proximity or collision warning systems. These conventional systems can provide a warning signal to the vehicle operator and/or the operator of equipment in proximity to the vehicle if a piece of equipment such as a mine haul truck comes within some pre-defined range of another piece of equipment. Position sensor 302 also includes one or more systems for determining an orientation of the vehicle. In some cases, orientation may be determined by an electronically-readable compass or other systems that uses the earth's magnetic poles to determine orientation. In other cases, the vehicle's orientation may be sensed using one or more terrestrial beacons or devices mounted in and around the mining environment. In other cases, the vehicle's orientation can be determined algorithmically, for example by tracking a movement of the vehicle over time, sensor 302 can make an accurate determination of the vehicle's orientation.

In other implementations, position sensor 302 is assisted by a number of external devices that are mounted around various objects in the mining environment to assist in determining a location and an orientation of the vehicle. For example, a number of radar, LIDAR, laser, or other object-detection systems could be installed at the entrance to a crusher bay or other equipment disposed around the mining environment. As a vehicle approaches the bay, object-detection systems can scan the entrance to the bay and communicate the results of their scan to the vehicle. The vehicle uses the information received from the externally-mounted object-detection systems to supplement the information retrieved from position sensor 302 to generate a more accurate description of the vehicle's current position and orientation. These object-detection systems can be used in any location of the mining environment, but may be particularly useful at bay entrances or at any location where a vehicle must navigate particularly accurately. These externally-mounted systems can be mounted on any equipment, features, or objects within the mining environment (e.g., shovels, buildings, crushers, etc.). The externally-mounted systems allow for peer-to-peer aggregation of vehicle and object positional data within the mining environment allowing for more accurate information that can be acquired from sensors mounted on a single vehicle. In one example externally-mounted sensor system, a particular shovel may have a mounted scanning laser to accurately determine the position of a truck relative to the shovel. The data collected by the shovel using the laser system can then be communicated to the truck. That additional data can then be used by the truck to refine its own positional data with respect to the shovel. The combination of positional data collected by the truck's sensors, as well as the shovel's sensors can then be used in navigating the truck into position beside the shovel, for example.

When interacting with externally mounted object-detection systems, the external systems may only be able to observe a small portion of the vehicle. For example, when using LIDAR, or radar for example, the systems may only be able to communicate information regarding distance from the detection system to the side of the vehicle that is being presented to the object-detection system—the other sides of the vehicle will be obscured. In that case, though, the present system can use the information received from the object-detection system (including the location of the object-detection system itself) to supplement data retrieved from position sensor 302.

System 300 includes a number of databases storing information useful in providing the functionality of the present disclosure. Distributed objects database 304 stores a listing of objects that are present within the mining environment. Distributed objects database 304 can store listings of candidate target destinations (where each object in the database may be a target), the position of vehicles and hazards or boundaries within the mining environment. Additional objects stored in distributed objects database 304 can include roadways, parking areas, repair facilities, buildings or structures, dumping areas, or power lines.

For each object, distributed objects database 304 can store, in addition to the location information for each object, additional descriptive information that identifies characteristics of the object. For example, in the case of vehicles, the database can store information describing the type of vehicle, its size and capacity, its current status (e.g., loaded or unloaded, in use or not in use, etc.), weight, and velocity. For each vehicle, the database may also store information describing the operator of the vehicle (e.g., the operator's experience level, current assignment, shift status, etc.). In the case of hazards, the database can store information describing the severity of the hazards and may define a number of hazard zones around each hazard. In fact, for each object, the database may define a number of hazard zones around the object, with each zone (e.g., a circular area defined around the hazard) representing a different degree of danger. The database can also store information describing roadways and boundaries of the mining environment. In the case of roadways, the database can store information describing a weight limit for vehicles traversing the roadway. Additional information such as slope, consistency, and speed limit can be stored.

In some cases, the objects defined within distributed objects database 304 vary over time. Because the mining environment is constantly being modified by the mining operations, nearly all objects within distributed objects database 304 can change over time. Accordingly, to ensure that database 304 contains up-to-date information, the contents may be periodically refreshed via a connection to a central computer system that monitors the position and status of objects within the mine environment. Accordingly, whether distributed objects database 304 is based in the vehicle, a central computer system, or a combination of both, distributed objects database 304 is configured to be constantly updated. Updates to distributed objects database 304 are distributed efficiently and the database reflects the known objects within the mining environment at any point in time.

System 300 also includes vehicle condition monitor 306. Vehicle condition monitor 306 is configured to monitor one or more systems within the vehicle and determine a current status or condition of those systems. In some cases, vehicle condition monitor 306 communicates with one or more vehicle sensor 308 mounted in and around the vehicle to determine the current status of those systems. For example, vehicle condition monitor 306 may monitor a current status of the vehicle's fuel level or fuel status, wheel positions (e.g., in two-wheel or four-wheel configurations, the angle of the wheels can be measured), current selected gear (e.g., forward or backward gears), braking status, etc. Vehicle condition monitor 306 can also determine whether the vehicle is carrying a load or whether the vehicle is empty. Vehicle condition monitor 306 can also track a current speed of the vehicle. When the vehicle includes sensors for monitoring a health level of various components of the vehicle (e.g., engine temperature, tire pressure, battery charge levels), vehicle condition monitor 306 can also communicate with those sensors to identify the current status of the connected systems.

System 300 also includes configuration database 310. Configuration database 310 stores information describing certain vehicle attributes or conditions that are to be met before the vehicle can undertake a particular maneuver. For example, configuration database 310 may store a set of conditions that must be met before the vehicle can navigate to a particular target destination. Example conditions include that the vehicle be in a forward gear, that any emergency braking systems be disengaged, that the vehicle have sufficient fuel to complete a particular journey, that the vehicle not be scheduled for emergency maintenance that the vehicle must undergo before the navigation can occur, etc. The set of conditions included in configuration database 310 can be different based upon the vehicle and the particular maneuver the vehicle is attempting to undertake. Additional maneuvers may include dumping material, for which configuration database 310 would include a condition that the vehicle be carrying sufficient material to warrant dumping. As another example, before attempting a re-fueling maneuver, configuration database 310 may specify a condition that requires the vehicle to have less than a particular amount of fuel reserves available.

The system 300 includes a number of modules (e.g., which may be implemented at least partially in a remote application) that act on data received from one or more of position sensor 302, distributed objects database 304, vehicle condition monitor 306, and configuration database 310.

The system 300 includes navigation aid 322 that is configured to one or more of position sensor 302, distributed objects database 304, vehicle condition monitor 306, and configuration database 310 to assist an operator of the vehicle to navigate to a particular target destination. To begin a navigation maneuver, navigation aid 322 is configured to access position sensor 302 and distributed objects database 304 to identify a listing of potential target destinations. The list of potential targets can be filtered by navigation aid 322 on a number of variables. For example, the listing can be ordered based upon proximity to the vehicle, with targets that are over a threshold distance away being filtered out. Also, based upon various attributes of the vehicle (the attributes can be retrieved from vehicle condition monitor 306 and/or distributed objects database 304) the targets can be filtered. If, for example the vehicle is a shovel, then targets that are only useful to haul trucks can be filtered out. Conversely, if the vehicle is a haul truck, only targets useful to haul trucks are used. Additionally, if the haul truck is fully loaded, for example, only targets that are useful to fully loaded haul trucks are included in the listing of potential targets.

After identifying the listing of potential targets, navigation aid 322 can display the listing via screen 320. A user interface (e.g., a touch screen, keyboard, voice input, or other user input system) allows an operator of the vehicle to select one of the targets. In other implementations, an automated system selects the target automatically and the selected target is displayed via the user interface.

After a particular target destination is selected, navigation aid 322 uses position sensor 302, distributed objects database 304, vehicle condition monitor 306 and configuration database 310 to identify a best path for the vehicle to follow in order to maneuver into position at the target.

After identifying a best path, navigation aid 322 verifies that the vehicle can begin moving using vehicle condition monitor 306 and configuration database 310. If so, navigation aid 322 constantly monitors the current position of the vehicle with respect to the selected path using position sensor 302. Using the vehicle's current position and orientation, navigation aid 322 uses screen 320 to provide feedback to the vehicle operator to assist the operator in maneuvering the vehicle along the selected path. As the vehicle begins to deviate from the selected path, for example, navigation aid 322 may use screen 320 to provide feedback to the operator instructing the operator to turn the vehicle to return to the selected path. Alternatively, feedback could be provided via other user interfaces 324. For example, navigation instruction could be provided by the vehicle's rear view mirrors. A number of light sources (e.g., LEDs) may be disposed around the housing of the rear view mirror. By illuminating various combinations or colors of the light sources, the vehicle operator can be instructed to maintain the current course, steer to the left by a small degree, steer to the right by a small degree, steer to the left by a large degree, or steer to the right by a large degree. The light sources may also indicate when no alignment with a defined route or path is possible. In other implementations, user interface 324 could include a heads-up display or virtual reality output for displaying a particular path, route, or other information for the vehicle operator. Additionally, voice instruction could assist an operator in navigating a particular path.

In one implementation, navigation aid 322 uses screen 320 to display a roadmap illustrating the area in proximity to the vehicle. The map can be supplemented to display various objects that are described in distributed objects database 304. For example, screen 320 could depict the movements of other vehicles, the position of hazards as well as hazard zones defined around each hazard, roadways and various boundaries defined within and surrounding the mine environment. The roadmap representation can include any appropriate geographical features such as acceptable routes, route attributes, hazards, out-of-bounds areas and the location of points of interest, for example, individual work sites or pieces of equipment. Navigation aid 322 can optionally use screen 320 to display overhead imaging data generated, for example, by satellite or aerial photography that is scaled and oriented to be co-extensive with the representation of the roadmap system and stored within distributed objects database 304, or another suitable data storage system.

Navigation aid 322 uses screen 320 to display the location of the vehicle on the visual representation of the roadmap system, overlaid on overhead imaging data on screen 320. A graphical user interface (GUI), not shown, allows a user to alter the scale and orientation of the visual representation of the roadmap system and plot acceptable routes between the current location of the remote vehicle and predefined points of interest.

Figure 5:
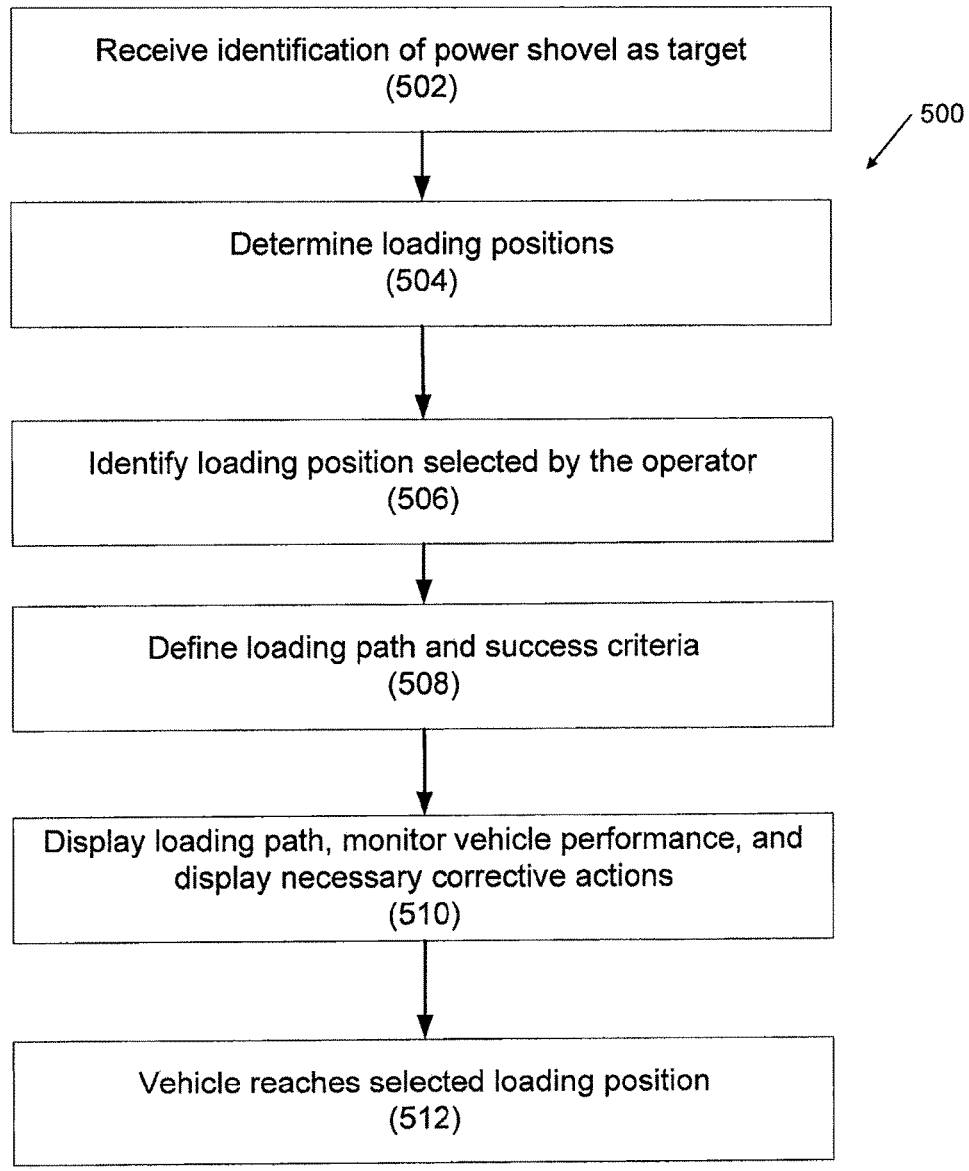
FIG. 5 is a flow chart illustrating an example method for navigating a vehicle to a target destination according to an embodiment of the invention.
Figure 6:
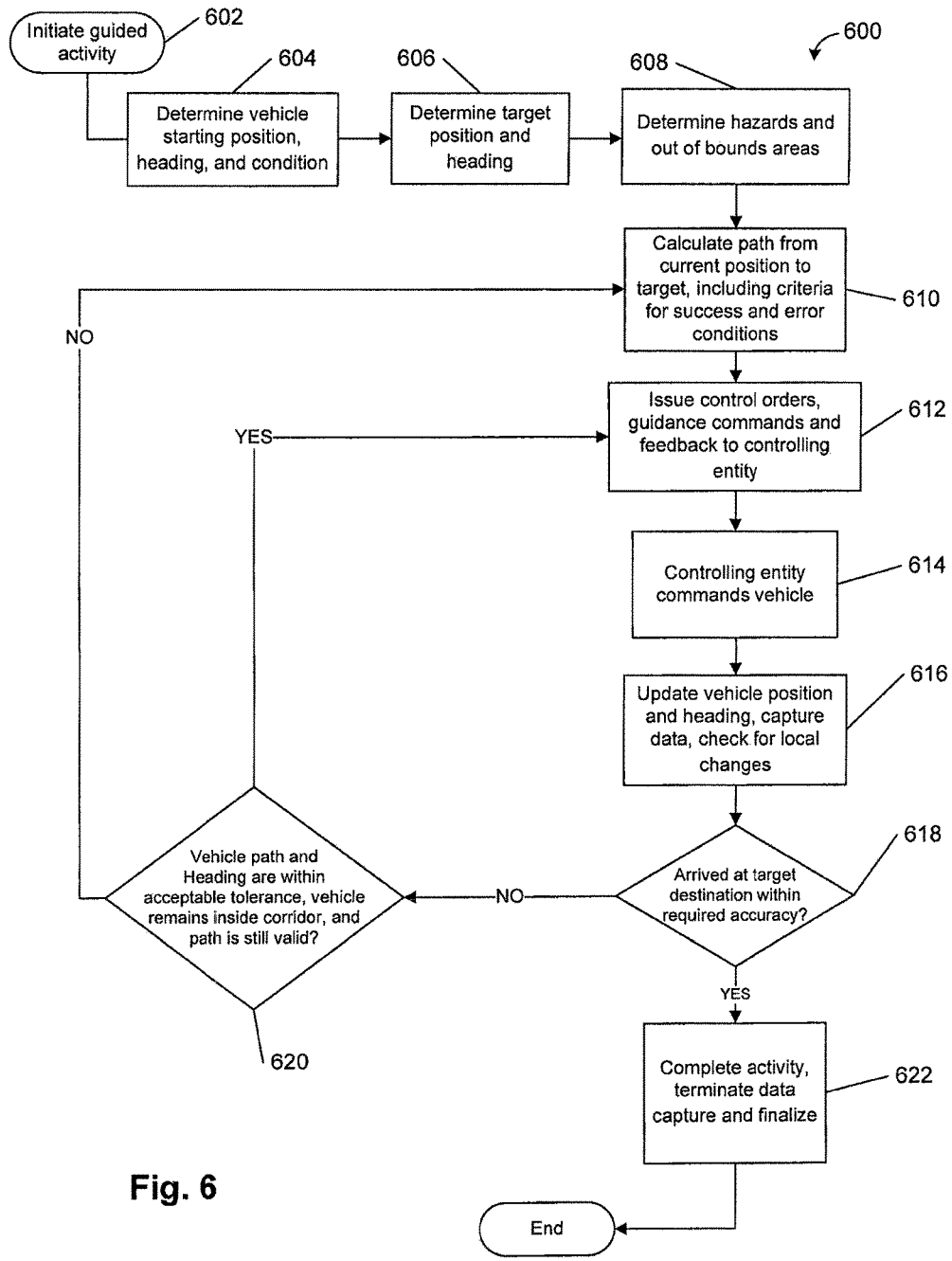
FIG. 6 is a flow chart illustrating steps of an alternative method for navigating a mining vehicle to a destination in accordance with the present disclosure.

In one implementation, navigation aid 322 is configured to operate in accordance with the methods illustrated in FIG. 5 or FIG. 6, for example.

System 300 may also include speed checker 312. Speed checker 312 is configured to check the speed of the vehicle against an allowable speed retrieved from distributed objects database 304 for the vehicle's current position (determined by position sensor 302). Speed checker 312 can calculate the vehicle's speed using GPS or other data received from the position sensor or might read the vehicle's speed directly from the vehicle.

System 300 may also include proximity detector 314 that checks the vehicle's position against the location of objects defined in distributed objects database 304. The vehicle's position is typically checked against objects such as, for example, defined hazards, other vehicles, areas that have been defined as out-of-bounds or not on a defined route, or areas that are on a defined route but that only permit a particular direction of travel. In some cases, proximity detector 314 compares the vehicle's current position to a number of hazard zones that are defined around a particular object. Depending upon which (if any) hazard zones the vehicle currently occupies, proximity detector 314 can cause different levels of alarm to be sounded for the operator of the vehicle.

Information from the speed tracker 312, proximity detector 314, and one or more of vehicle sensors 308 is passed to violation manager 316. Violation manager 316 includes a rule set that compares the location and attitude of the vehicle with attributes defined in distributed objects database 304 and returns an indication if certain rules are violated. The rule set may comprise a selected route through a particular environment that has associated with it particular attributes that are inspected by violation manager 316 in view of the received sensor data. For example, the attributes may include operational tolerances of the vehicle attempting a particular maneuver. If the tolerances are to be exceeded by the vehicle as it progresses along the route, violation manager 316 detects that a rule has been violated and outputs the violation on a suitable user interface device, such as screen 320 or speaker 318. Rules within violation manager 316 can optionally govern such conditions as whether the remote vehicle has violated a speed limit associated with a particular route, whether the vehicle is proceeding in the wrong direction along a particular route, whether the remote vehicle has left a designated route, entered an off-limits area, neared a hazard, or is too close to another vehicle. Rules included in the violation manager 316 need not be Boolean. The violation manager can, for example, maintain various distances around hazards and trigger different indications as the vehicle gets closer to the hazard. Similarly, violation manager 316 can return different indications depending on how far off a designated road a vehicle has ventured.

Depending on the definition of the rule set of the violation manager 316, system 300 can take varying actions when a rule is violated. When a rule is violated, an indication can be sent from the remote vehicle to a different location, for example, a central application (not shown). When a vehicle comes too close to a predefined hazard, for example, a central office at the mine can be notified so that the event can be logged. The violation manager 316 can additionally or alternatively supply an audible alarm to a speaker 318 or a visual alarm to a screen 320 visible to the driver of the remote vehicle.

System 300 can optionally include a user messaging function to alert the vehicle operator of messages, such as instant messages or electronic mail, relayed to system 300 from a central application not shown. When a user receives a message, audible alarms can be sent to speaker 318 and visual alarms as well as a display of the message itself can be sent to screen 320.

System 300 may also optionally include a data storage module that is updated from a central application (not shown). For example, system 300 may include a database or other data storage system that stores roadmap data, overhead imaging data, or time varying data on a remote vehicle's position and/or condition. The database can be periodically updated by the central application (not shown), through a data synchronizer.

System 300 along with any necessary data storage and communications hardware can be included in a variety of known devices, for example, handheld personal data assistants (PDAs), laptop computers, or "smart" cellular telephones.

Figure 4:
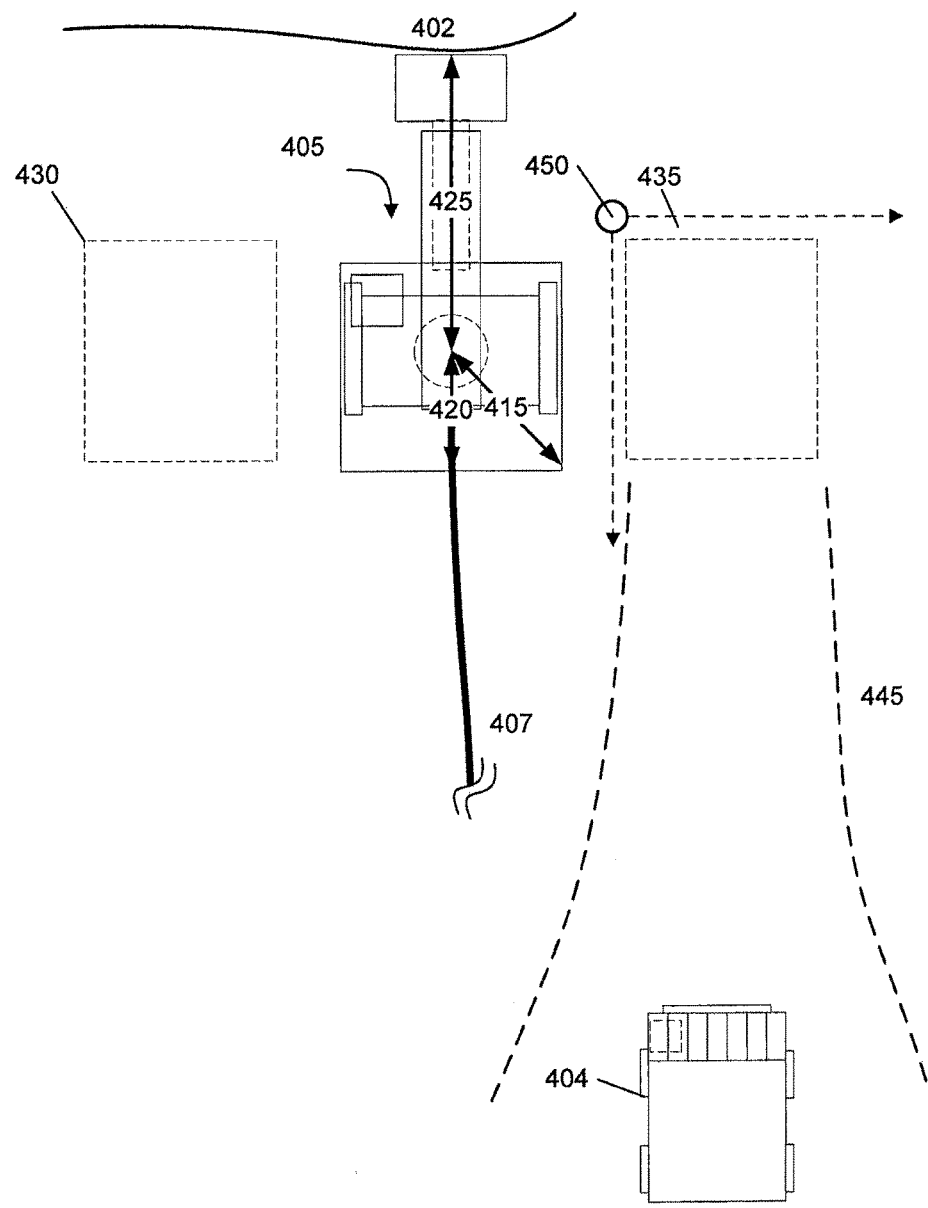
FIG. 4 is a diagram showing an example arrangement of a mine haul truck and a shovel where loading areas are arranged proximate to the shovel.

FIG. 4 shows an arrangement for navigation assistance according to an embodiment of the invention. The arrangement of FIG. 4 shows a power shovel 405 positioned at a face 402 for loading operations and depicts an implementation of the present system where a haul truck uses the navigation system to assist in positioning the haul truck at a loading position next to the shovel. In one implementation of the present system, the illustration shown in FIG. 4 is displayed by navigation aid 322 on screen 320 as shown in FIG. 3.

There are a number of shovel-related parameters of interest that are used to identify one or more loading target position around the shovel. The most significant parameter is the shovel's location that can be measured directly by a GPS receiver or calculated on the basis of known dimensions of the shovel and the location of the GPS antenna. Additional useful parameters are the tail drag radius 420, the corner drag radius 415, and the boom radius 425. These parameters set the outside envelope for the space the shovel will occupy during loading operations and can be defined in a database such as distributed objects database 304 shown in FIG. 3. These parameters are illustrated in FIG. 4 with reference to the center of rotation of the upper assembly of shovel 405.

In FIG. 4, haul truck 404 wishes to navigate to a position beside shovel 405 to receive material. Accordingly, the operator of truck 404 uses the present system to initiate a navigation maneuver. First, the present system (e.g., navigation aid 322 and screen 320 of FIG. 3) identifies two candidate target destinations, loading area 430 and loading area 435. The target destinations are displayed for the vehicle operator and the operator can select one of the target destinations to initiate the maneuver. Alternatively, a target destination could be selected automatically, or a selection may be made by another individual or vehicle operator (e.g., a dozer operator at a dump, foreman, etc.) having control authority over the vehicle.

After selecting, for example, loading area 435 as the target destination, the present system determines an appropriate path 445 that truck 404 can take to reach loading area 435. As seen in FIG. 4, the boundary of path 445 is selected to avoid cable 407 and other hazards and boundaries that should be avoided by truck 404. Additionally, although at first, the boundaries of path 445 are relatively wide, as truck 404 approaches shovel 405, the path narrows to ensure that truck 404 is safely guided into loading area 435.

To assist in navigating truck 404 into target area 435 externally mounted object-detection system 450 is mounted next to area 435. As the truck approaches area 435, the truck communicates with system 450 to retrieve additional information describing the position and orientation of truck 404. In one implementation, system 450 includes a radar or LIDAR object detection system.

As discussed below, various attributes of loading area 435 such as size, preferred direction of entry, etc., can be at least partially determined by various characteristics of truck 404.

FIG. 5 is a flow chart illustrating method 500 for navigation assistance according to an embodiment of the invention that allows a truck to enter a loading area defined next to a shovel. Method 500 is just one example method and represents a high-level summary of steps undertaken by the present system that are illustrated in more details in FIGS. 6-12.

In step 502 of method 500, a central application running on, for example, navigation aid 322 of FIG. 3 receives an identification of a shovel from which a truck wishes to receive material. Using the shovel identification, the system retrieves information describing various attributes of the shovel (e.g., tail drag radius, corner drag radius, and boom radius) and, using those attributes, identifies one or more loading areas defined around the shovel in step 504.

The candidate loading areas are provided to the vehicle operator, and in step 506 the system identifies one of the loading areas that has been selected by the operator. In step 508, after the selected loading area is identified, the system identifies an appropriate loading path that may be traveled by the vehicle to enter the selected loading area. As described below, the path is selected to avoid hazards and/or boundaries that should be avoided by the vehicle as it navigates through the mining environment. Additional criteria may be defined for assessing whether the selected path has been successfully navigated.

In step 510, the defined loading path is displayed to the operator so that the operator can begin to navigate the vehicle along the path. Also in step 510 the system continuously monitors characteristics of the vehicle (e.g., position, vehicle performance, and trajectory) to ensure that the vehicle is staying within the defined path. As the vehicle begins to deviate from the displayed path, the present system can provide feedback to the vehicle operator to assist the operator in returning to the displayed path. Accordingly, the present system continuously monitors the performance of the vehicle with respect to the defined path. In step 512, the vehicle reaches the identified loading position and the method finishes.

FIG. 6 is a flow chart illustrating the steps of method 600 for navigating a mining vehicle or other heavy equipment to a destination in accordance with the present disclosure. For several of the steps shown in FIG. 6, additional flowcharts showing an example implementation of each step are shown in FIGS. 7-12.

Method 600 may be implemented by system 300 illustrated in FIG. 3 and described above, through other portable computer systems in communication with various database and vehicle sensor systems that may also implement method 600. In some implementations, for example, the method may be executed by computer hardware residing on the heavy equipment (e.g., mining vehicle), the centralized computer system, or may be distributed across multiple systems. Method 600 uses data from multiple data sources to identify a suitable target and assist a driver or automated system to navigating the heave equipment or other mining vehicle to that target. Example data sources may be provided by, for example, the navigation system, vehicle status system, configuration database, and distributed objects database described above (e.g., distributed objects database 304, vehicle condition monitor 306, or configuration database 310). These databases may be made available by any appropriate computer system in communication with the software application executing method 600, such as software executed by navigation aid 322 of FIG. 3.

Method 600 begins by initiating the guided activity in step 602. Step 602 may involve connecting to necessary databases or systems, and powering up necessary sensors and computer systems for implementing method 600. In step 604, the vehicle's current position and heading is determined. This step may also include determining the vehicle's starting condition and verifying that the vehicle is capable of beginning a particular maneuver.

Figure 7:
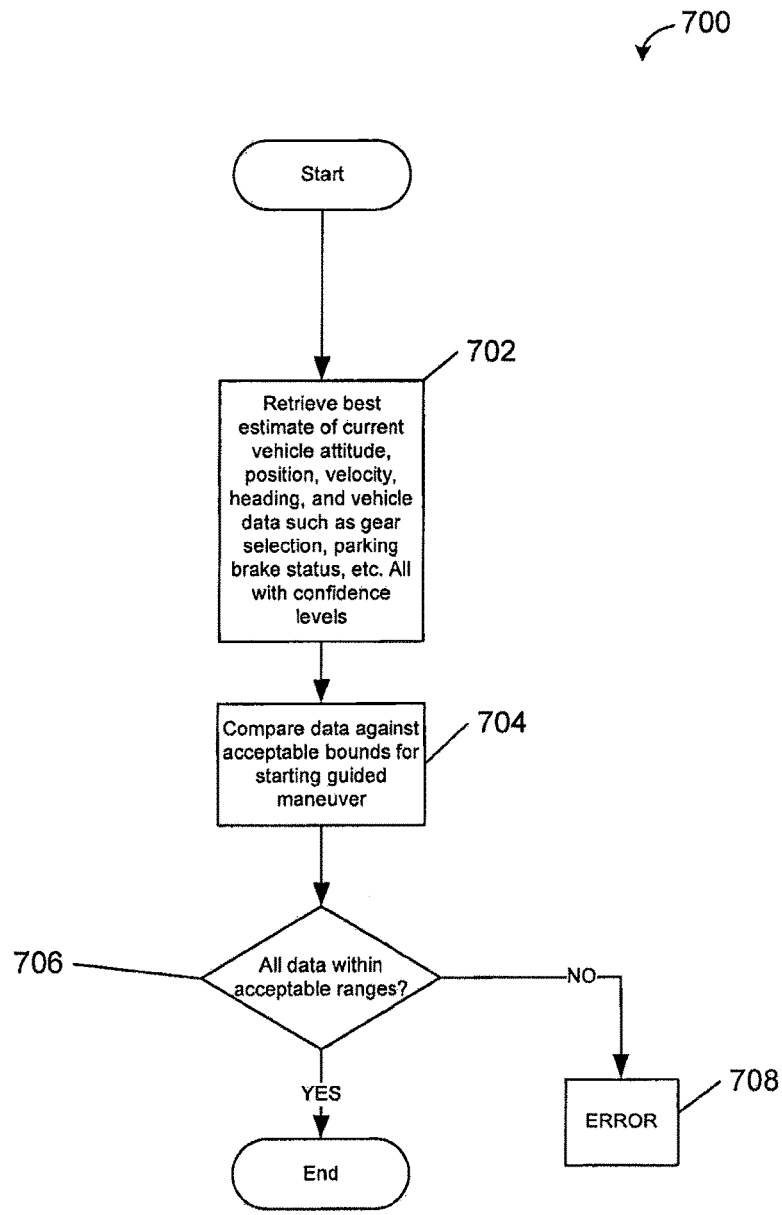
FIGS. 7-12 are flow charts illustrating additional details of various of the steps of the present method.

FIG. 7 is a flow chart showing a series of steps 700 that may be undertaken to complete step 604 of FIG. 6. In step 702 the current vehicle attitude, position, velocity, and heading are determined, for example by retrieving the corresponding data from the position sensor 302 and/or vehicle condition monitor 306 of FIG. 3. Each data point associated with the current vehicle attitude, position, velocity, and heading may be associated with a confidence level indicating an anticipated accuracy of the data. The confidence levels can then be used to determine margins of error that can be used to evaluate the safety of a particular maneuver.

In step 702, additional vehicle condition data is retrieved from a vehicle condition monitor (e.g., via vehicle condition monitor 306 of FIG. 3). The vehicle condition data may include the current gear selection, payload, parking brake status, or other information identifying a condition of the vehicle that can be useful to determine a capability of the vehicle to execute a particular maneuver. Additional information may include, for example, engine size, fuel reserves, tire or wheel types (indicating whether the vehicle is capable of traveling over particular types of terrain), maintenance or repair status (indicating, for example, whether the vehicle should avoid long distance maneuvers). The vehicle condition data may also describe the vehicle's performance characteristics such as turning radius, maximum speed, optimum speed for fuel efficient operation, maximum slope that the vehicle can climb, weight of the vehicle, or other information that is used to determine whether the vehicle can proceed along a particular path in a mining environment.

The condition data may also include condition data for the vehicle operator. If, for example, the vehicle operator is nearing the end of his or her shift, a maximum distance or time duration estimate may be established for any particular maneuver to ensure that the driver can complete the maneuver in time to go off shift.

The vehicle condition data can also include a current work assignment for the vehicle.

Given the vehicle's position and current condition status in step 704, the system uses the positional, vehicle condition, and operator condition data to determine whether the vehicle is capable of beginning a particular maneuver or by identifying a class of suitable maneuvers. The system does this by retrieving information from a configuration database (e.g., configuration database 310) that identifies attributes of suitable maneuvers that may be executed by the vehicle and/or conditions that must be met before a vehicle can begin a particular maneuver.

For example, if the vehicle is currently carrying a full (or nearly full load), the vehicle will be unable to begin any maneuvers involving the vehicle collecting additional material. As such, the set of candidate authorized maneuvers will only include maneuvers involving the vehicle dumping at least a portion of that load. Conversely, if the vehicle is empty, the set of maneuvers involving dumping material will be outside of acceptable bounds.

Additionally, if the vehicle is low on fuel, or requires immediate or urgent maintenance, the class of acceptable maneuvers may only include those that would rectify those deficiencies.

Also, the driver condition can be used to identify a class of acceptable maneuvers. If, for example, the driver is only novice, certain, more complex maneuvers may be unacceptable. Similarly, if the driver is reaching end of shift, the set of acceptable maneuvers may be limited on that basis.

The conditions may call for the vehicle being stopped or moving at a particular speed or range of speeds before a maneuver can be initiated. The conditions may also call for a parking brake to be engaged or disengaged before initiating a maneuver.

In step 706, if the vehicle positional data (e.g., position, orientation, and velocity), condition, and driver condition data are acceptable for beginning a maneuver, method 700 ends. If, however, the data are outside of acceptable ranges, the method moves to step 708 which allows an error to be displayed to an operator of the vehicle or other individuals or automated systems in communication with the present system.

Returning to FIG. 6, after collecting the vehicle position and condition data in step 604, the method determines an appropriate target position and heading in step 606. This step may involve the system retrieving a list of appropriate targets based upon the data collected in step 604 and allowing the vehicle operator to select one of those targets. Because any particular mine environment may include a large number of targets, the listing generated by step 606 can be filtered based upon the data retrieved in step 604. For example, the list of targets will only include targets that are within a certain distance, and compatible with the current orientation of the vehicle as well as the vehicle and the driver's current condition.

Figure 8:
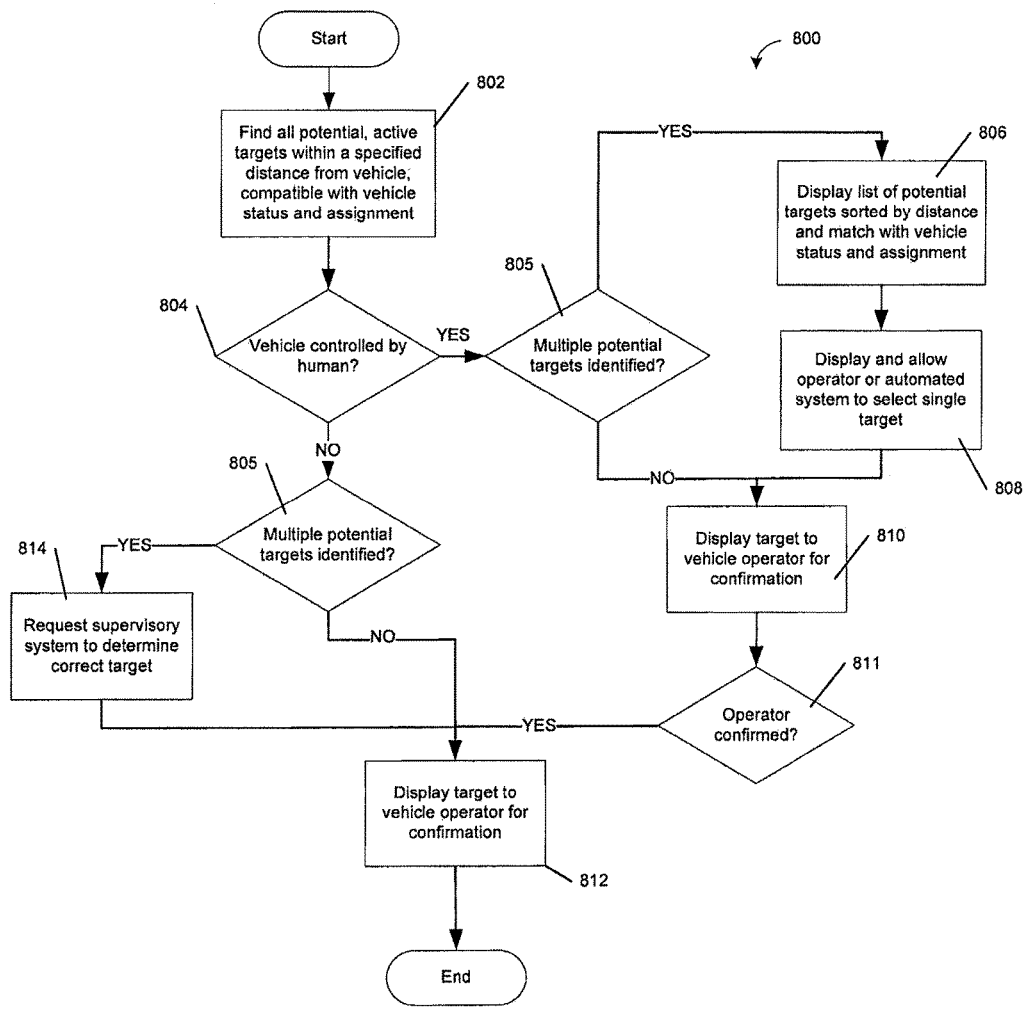

FIG. 8 is a flow chart showing a series of steps 800 that may be undertaken to complete step 606 of FIG. 6. In step 802, a listing of potential targets is retrieved from the distributed objects database (e.g., distributed objects database 304 of FIG. 3). Because a mine may have many hundreds (or thousands) of potential targets, the listing of candidate targets is filtered based upon the vehicle position and condition data, as well as the operation condition data retrieved in step 604 of FIG. 6. The listing can also be filtered based upon the distance of the target from the vehicle as well as the vehicle's current job assignment or vehicle capabilities.

As discussed above, the candidate targets may include static geographic features within the mine such as bays at a repair facility, bays at a crusher, parking areas, or dumping sites. In some cases, though, the targets are moveable. For example, in a listing of targets that may be accessed by a shovel, the targets may include mining faces or other locations where the shovel can dig material. In that case, the target, although moving slowly, is moveable.

In other cases, the targets locations can be determined by the location of a particular vehicle which is itself moveable. For example, when a haul truck needs to receive material from a shovel, there may be several candidate target destinations located around that shovel. For example, as shown in FIG. 4, most shovels will have at least two targets located about them, one on either side of the shovel. Other vehicles, such as larger shovels, may provide for more than two targets for a haul truck.

When retrieving the list of candidate targets from the distributed objects database, the distributed objects database may filter the list of targets based on their availability. For example, if the distributed objects database defines two targets about a shovel, but one of the targets is currently occupied by another haul truck, the distributed objects database would not return that target as a candidate target. Similarly, if one or more bays at a crusher are down for repair, they would not be included in the list of candidate targets. Or, if some bays of the crusher are preferred over others (for example, to balance wear and tear on the crusher or to even the flow of material through the crusher), particular bays may be preferred over others, with the unpreferred bays being filtered out.

In some cases, where the targets include a number of bays at a crusher, the targets can be filtered based upon a material being carried by the vehicle. For example, by analyzing a position of the vehicle at which it picked up material from a shovel, the type of material being carried by the vehicle can be characterized by determining the type of material being mined at that location. Alternatively, the type of material being mined by the haul truck can be indicated as part of that truck's assignment. The particular assignment can then be retrieved by the present system to identify potential dumping targets based upon that assignment. Based upon that characterization of the truck's load, particular bays at a crusher can be filtered from the target list to ensure that the material is being supplied to the most appropriate bay or bays at the crusher.

Information regarding whether a particular target is available, or is otherwise occupied, can be retrieved from the mine's central computer system, for example, or can be updated within the distributed objects database.

Having retrieved the listing of candidate targets from the distributed objects database, the present system compares the listing of candidate targets to the vehicle positional and condition data as well as the vehicle operator's condition data. Based upon that comparison, the list of candidate targets is further refined. For example, targets that are beyond a maximum distance away, or are irrelevant based upon the vehicle's current assignment are filtered out. Similarly, targets that would require too much skill for an untrained driver are filtered out if the driver does not have sufficient experience. Similarly, targets that would require too much time to navigate too are filtered out if there is insufficient time left in the driver's shift to reach such a destination.

The candidate targets may also be filtered based upon the current condition of the vehicle. If the vehicle has no current scheduled maintenance, targets relating to maintenance facilities can be filtered out. Also, targets can be filtered based upon whether the vehicle is configured to take on more material, or needs to dump some material. Additionally, if the vehicle is in need of fuel, targets that include fueling stations may be included in the list of candidate targets, where they would ordinarily be filtered out.

In step 804, the system determines whether the vehicle is controlled by a human or is automated. If controlled by a human, and the filtered listing of candidate targets generated in step 802 contains multiple entries, (evaluated in step 805) the listing is displayed for the operator in step 806 (e.g., via screen 320 of FIG. 3). In one implementation, the listing is filtered by distance and how well the target matches suitable uses for the vehicle and its current assignment. An automated system or the operator of the vehicle can then select one of the targets in step 808. The vehicle operator may use an appropriate user interface of the system to make the target selection.

In some cases, after executing step 808, the target selected by the operator is communicated to a mine supervisor for additional authorization. For example, the selection may be communicated to the mine's central computer system where the selection is displayed for a supervisor. The selection can then be evaluated by the supervisor and the supervisor can approve or deny the selection. If approved, the method would then move onto step 810. If, however, the supervisor denies approval, the method would return to step 806 and the operator can select another target.

In step 810, the target selected by the operator is displayed for the operator's confirmation. If, the operator does not confirm the selection (evaluated in step 811), then the system may generate an error, or can return to step 806. If, however, the operator does confirm the selection, the method moves to step 812. In some implementations, to minimize target selection time, the steps requiring operator confirmation are skipped by the system. Additionally, in some implementations the confirmation step illustrated by block 810 of FIG. 8 is removed from the system and after completion of step 808, the system moves straight to step 812.

Returning to step 804, if the vehicle is autonomously controlled, and multiple filtered targets were generated in step 802 (evaluated in step 807), the system moves to step 814. In step 814, a supervisor (e.g., an individual and/or automated system) reviews the list of targets generated in step 802 and selects the most appropriate target for the autonomous vehicle. The supervisor can be a human, or, in some cases, an automated mine supervisor system. The automated system evaluates the target listing in view of the other activities of other vehicles operating in the mine and automatically selects the most appropriate target. If only a single target was generated, though, the system selects that target and moves to step 812 (in some implementations, this single target would also require approval by a supervisor). In step 812, the position and heading of the selected target is determined and the target is displayed to the vehicle operator for confirmation. The system may also then verify that any parameters associated with the selected target fall with acceptable, predefined ranges.

Figure 9:
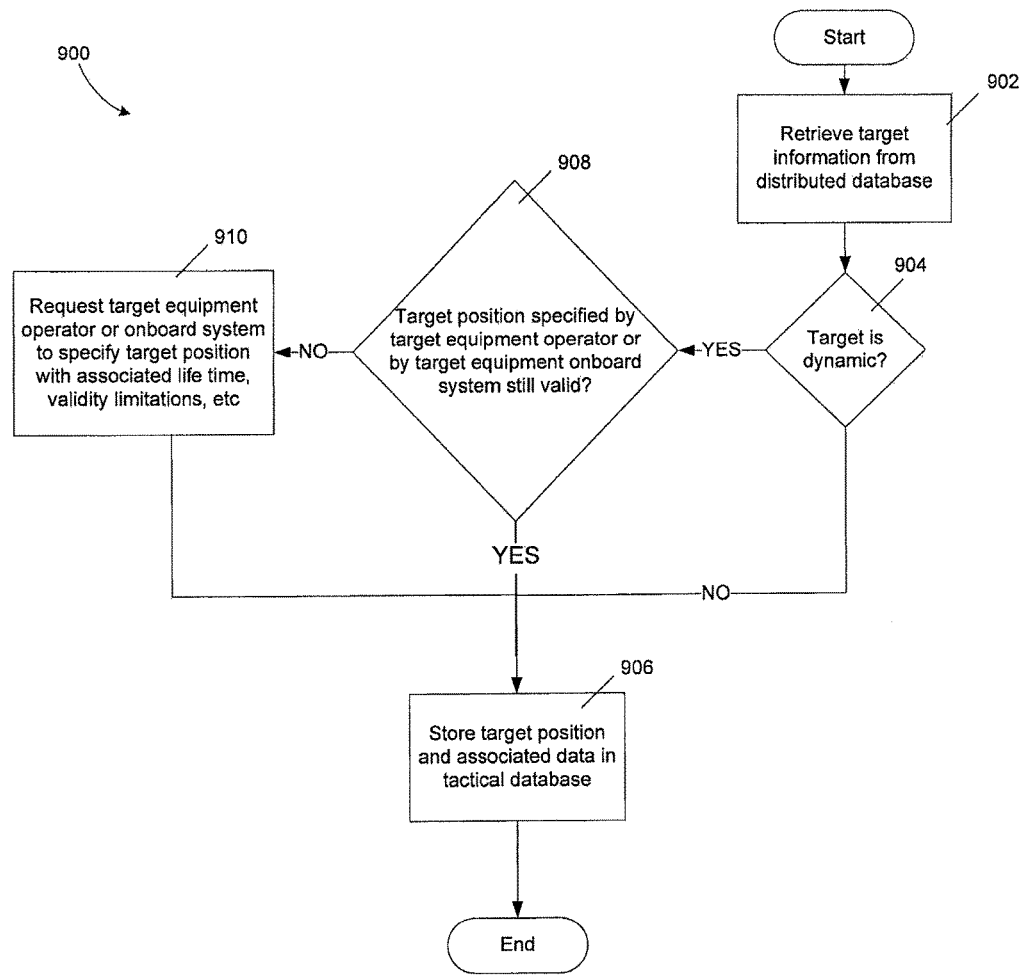

FIG. 9 is a flow chart showing a series of steps 900 that may be undertaken to complete step 802 of FIG. 8. In step 902, based upon the selected target, information describing the selected target is retrieved from the distributed objects database. The target information may include whether the target is static or dynamic.

In step 904, the system evaluates whether the target is static or dynamic (i.e., capable of moving in a relatively short time frame). If static (e.g., a crusher bay, fuel bay, predetermined parking spot, or predetermined dump spot), in step 906, the system stores target position and associated data in a current target database. The associated data may describe a particular path upon which the target should be approached, a preferred orientation for the vehicle when positioned at the target, or other target-based considerations that should be observed by the vehicle as it approaches or parks at the target.

If, however, the target is dynamic, in step 908, the system evaluates the target to determine whether the target position was specified by an equipment operator (e.g., by a shovel operator specifying targets positioned on either side of the shovel). In that case, if the target information has not changed (e.g., the position of the shovel has not changed, and the operator has not indicated that the target is no longer valid), the system moves to step 906 and stores the target information.

If however, the targets were established by the target equipment operator and have changed (or may have changed), the system moves to step 910 where a request is issued to the target equipment operator to confirm, or re-establish the location of targets that are at least partially determined by the target vehicle location. In that case, the new targets may have associated with them a lifetime after which the targets are no longer valid.

Alternatively, the targets may be associated with a set of conditions that determine whether the target is valid. For example, when a shovel operator defines a set of targets around the shovel (e.g., targets 430 and 435 shown in FIG. 4), the targets may only be valid as long as the shovel remains unmoved. If, however, the shovel should move location, the targets would immediately become invalid and would have to be reestablished by the shovel operator. In some cases, though, targets whose locations are defined by target vehicle position can be located based upon a current position and orientation of the target vehicle without confirmation or feedback from an operator of the vehicle.

After receiving the updated or confirmed target locations from the target equipment operator, the target information is stored in step 906. After storing the target information (for example, in navigation aid 322 of FIG. 3), the target information can be compared to the current vehicle position and orientation to calculate a heading towards the target.

Returning to FIG. 8, after determining the target location and heading in step 812, as well as other target information (e.g., other parameters that may be used to identify a suitable approach to the target as determined in step 812, or any preceding steps), the system verifies that the target location and information is within acceptable parameters. For example, the system may verify that the target is within range of the vehicle. Additionally, all parameters such as target position, heading, and any other data related to the target position and heading may be checked to ensure that it has not expired, is within acceptable ranges, and has confidence levels that exceed predetermined thresholds. For example, if the last position update from a target vehicle or other moveable object was recorded more than a given number of minutes or seconds in the past, then the position may no longer be valid. Of course, validity requirements and confidence levels can differ as between fixed and moveable targets positions or objects, with the fixed targets having a longer validity duration than moveable targets.

Returning to FIG. 6, after determining the target position and heading, in step 608, the system identifies hazardous conditions or boundaries that may exist between the vehicle and the selected target. To perform this step, the system may access the distributed objects database that stores positional data for equipment, hazardous areas, geographical features, and other objects or features within the mine environment. The distributed objects database may also store additional information describing the hazards, such as a number of danger zones that may be defined around each hazard, or speed limits that may be established for particular routes through the mine.

Figure 10:
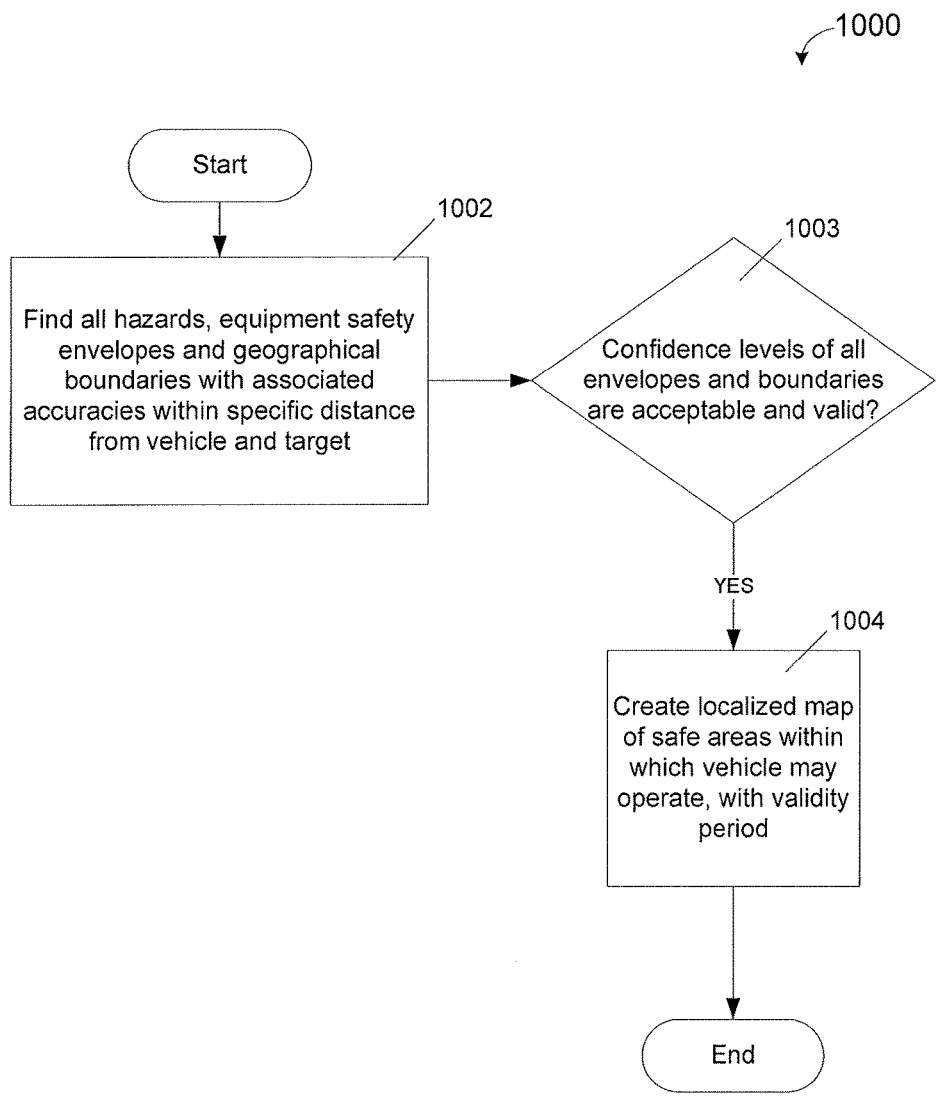

FIG. 10 is a flow chart showing a series of steps 1000 that may be undertaken to complete step 608 of FIG. 6. In step 1002, the system retrieves all hazardous conditions and boundaries that exist within a predetermined distance from the vehicle and the selected target. The hazards and boundaries can be retrieved from the distributed objects database described above. Each hazardous condition may have with it an associated consequence for coming near the hazardous condition. For example, each hazard may be associated with potential consequences such as "injury or death," "equipment damage," or "performance degradation" should the vehicle come into contact with, or enter a danger zone of a particular hazard.

Each hazard or boundary retrieved from the distributed objects database may have associated with it a particular accuracy rating indicating a confidence range for the accuracy of a particular hazard or boundary location.

In some cases, hazards may be somewhat dynamic. For example, hazards such as cable trees, blasting zones, other vehicles, or mining faces or cliffs can move continuously throughout the day. Accordingly, the distributed objects database is configured to store the most up-to-date location information for all hazards and boundaries that is accessible.

If the accuracy ratings or confidence levels associated with the hazards and boundaries are within acceptable levels (evaluated in step 1003), the system moves to step 1004 to create a virtual map of the mine site between the vehicle and the selected target that maps out hazards and boundaries that should be avoided by the vehicle when navigating to the selected target, otherwise an error may be generated. In some implementations, the map has a limited validity period. Upon expiration of the validity period, the map is rebuilt to ensure that the vehicle does not attempt to navigate using a stale map.

Returning to FIG. 6, in step 610, after identifying hazardous conditions or boundaries that may exist between the vehicle and the selected target, the system calculates a best path for the vehicle to the selected target in step 610 by calculating a path from the vehicle's current position to the target position. The path is selected based upon the defined criteria for success for the particular maneuver as well as established error conditions. Step 610 may also include calculated acceptable tolerances and/or corridors of safe movement along the calculated best path.

Figure 11:
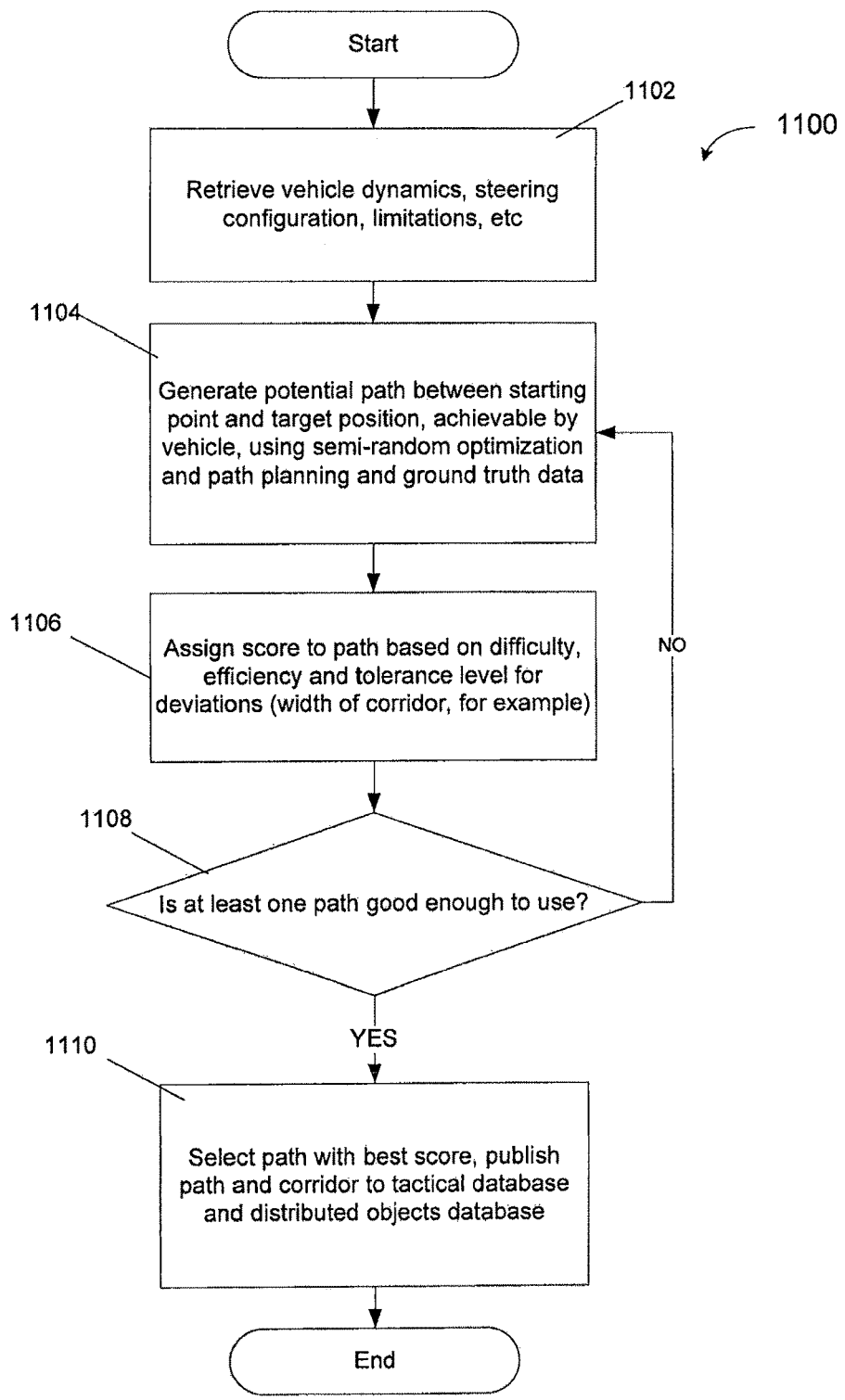

FIG. 11 is a flow chart showing a series of steps 1100 that may be undertaken to complete step 610 of FIG. 6. In step 1102, the system first identifies various performance characteristics of the vehicle. The characteristics can include steering configurations, such as whether the vehicle has four-wheel steering, and the vehicle's turning radius, performance information, such as stopping capabilities, and vehicle characteristics such as weight (either when loaded or unloaded). Depending upon the type of vehicle, the vehicle characteristics may also include buffer zones defined around the vehicle, where the buffer zone of the vehicle cannot overlap with any other hazards or boundaries identified by the system. In larger vehicles, for example, the buffer zones may be particularly large to ensure the vehicle does not come sufficiently close to a particular hazard or boundary to create a risk that an accident could occur. In some implementations, the buffer zones are defined by the maximum area that particular components of the vehicle can cover. For example, the buffer zones around a shovel may include the entire area that may be accessed by the shovel (e.g., the area covered by the bucket at full extension when processed through 360 degrees). In other cases, the buffer zones may be expanded to allow for the vehicle's turning wheel jutting out from the body of the vehicle during a turning maneuver). These vehicle characteristics (including the vehicle's buffer zone) can be retrieved from a vehicle condition monitor and/or configuration database (e.g., vehicle condition monitor 306 and/or configuration database 310).

In step 1104, after retrieving the vehicle characteristics, the system generates a first potential path between the vehicle and the selected target. The first potential path can be generated using semi-random optimization and path planning, or any other suitable process or algorithm for determining a candidate path. The path can be optimized based upon the data retrieved in step 1102, as well as any additional information describing the intermediate terrain (e.g., the virtual map generated in step 1004 of FIG. 10), or the selected target.

The potential paths can be limited by the vehicle's characteristics. For example, based upon the vehicle's turning radius, paths can be generated that would not require the vehicle to turn with a radius that is narrower than the vehicle's own optimum turning radius. Similarly, based upon the vehicle's ability to climb steep grades, the path can be generated to avoid any roadways or other routes that would require the vehicle to climb a slope that is too steep. Also, based upon the vehicle's weight (either loaded or unloaded), the path can be selected to ensure that the vehicle will only travel on roadways or paths that can support the necessary weight.

In one implementation, the potential paths are generated to minimize the build-up of ruts within the area between the vehicle and the target. As such, the system may be configured to inject a certain amount of 'dither' into a particular path to ensure that vehicles traveling on the same path do not create destructive or dangerous ruts. In one implementation, the position of each path through the mine environment can be adjusted based upon changing roadway conditions. As more and more vehicles utilize a particular roadway, for example, the position of the path defined through that roadway can be adjusted to avoid too many vehicles driving in the same area. Accordingly, in particular congested areas, the system can generate 'anti-rut' paths that are each configured to prevent multiple vehicles using the identical (or similar) paths to prevent rutting.

In one implementation, to prevent rutting, paths generated through congested areas are periodically varied, within acceptable boundaries, to prevent the build-up of ruts. The deviation can be selected randomly from alternative trajectories that ensure a continuous and steady travel within the congested area containing the originally-determined path.

After identifying a first potential path, the system assigns a score to the first potential path based upon the path's difficulty, efficiency, safety, and/or tolerance level for deviations. In one implementation, difficulty is evaluated based upon the number of turns that are required by a driver undertaking a particular task. Difficulty can also be affected by the type of the vehicle. For example, in some haul trucks the driver sits on the left side of the vehicle. In that case, because the driver has improved visibility from the left side of the vehicle over the right, left-hand turns would be rated easier than right-hand turns in the scoring algorithm. Similarly, when the selected target is in proximity to another vehicle (e.g., a target located next to a shovel), the difficultly can be evaluated based upon the visibility of the vehicle to an operator of the target vehicle. For example, when approaching a shovel, paths that allow the vehicle to be in view of the shovel operator for a greater length of time will be ranked easier than paths that obscure the shovel operator's view of the vehicle. By allowing for greater visibility, the shovel operator can more easily assist the vehicle to reach the desired target location.

In one implementation, to evaluate the safety of the potential path, the system analyzes how close to identified hazards and boundaries a particular path will cause the vehicle to operate. Although this analysis may be performed solely based on proximity to particular hazards (or hazard zones defined around particular geographical features or hazards) and boundaries, other factors can be used in evaluating the safety of a particular path. For example, using the consequences described above for particular hazards or boundaries, each path could be rated for any combination of safety, productivity, or cost in a tiered approach. The first tier would involve inefficiencies. For example, a particular path may be rated lower if it calls for the vehicle to pass through a particularly congested area of the mine, or take a longer route, for example. There may be little risk or damage or injury in that case, but the path would still result in loss of resources as it would take longer for the vehicle to reach the desired destination, and may consume more fuel as a result.

In a second tier, the paths can be scored based upon the likelihood of damage to equipment. If, for example, a particular path causes a vehicle to pass through an area of the mine where vehicle damage is likely to occur, perhaps due to road conditions, or other traffic, the path could be scored lower than other paths.

Finally, in a third tier, the paths can be scored based upon the likelihood of injury to mine workers. If, for example, a particular path causes a vehicle to pass through an area of the mine where injury is likely to occur (e.g., close to a blasting site, or near cliffs or other large drops), the path could be scored lower than other paths. In some cases, if there is any risk of injury, the path is immediately invalidated and a new path must be prepared.

In the tiered system described above, the tiers can be scaled so that risks of inefficiency do not result in as low a score as risks of equipment damage or injury or death. In some cases, if a particular path creates any risk of injury or death, that particular path is immediately allocated a score of 0 (or any other score indicating that under no circumstances will the path be used) and the process restarts at block 1104 by generating a new potential path.

In step 1108, if at least one potential path's score exceeds a particular threshold, the path is selected in step 1110. If, however, there are no paths having a sufficiently high score, the method returns to block 1104 and a new path is generated. This process repeats until a path having a sufficiently high score is generated.

In some cases, the system will initially generate a pool of candidate paths. Each path will then be scored, for example using the algorithm described above. The candidate paths can then be ranked, with the highest ranking path (assuming its score exceeds a particular threshold) being selected.

Figure 12:
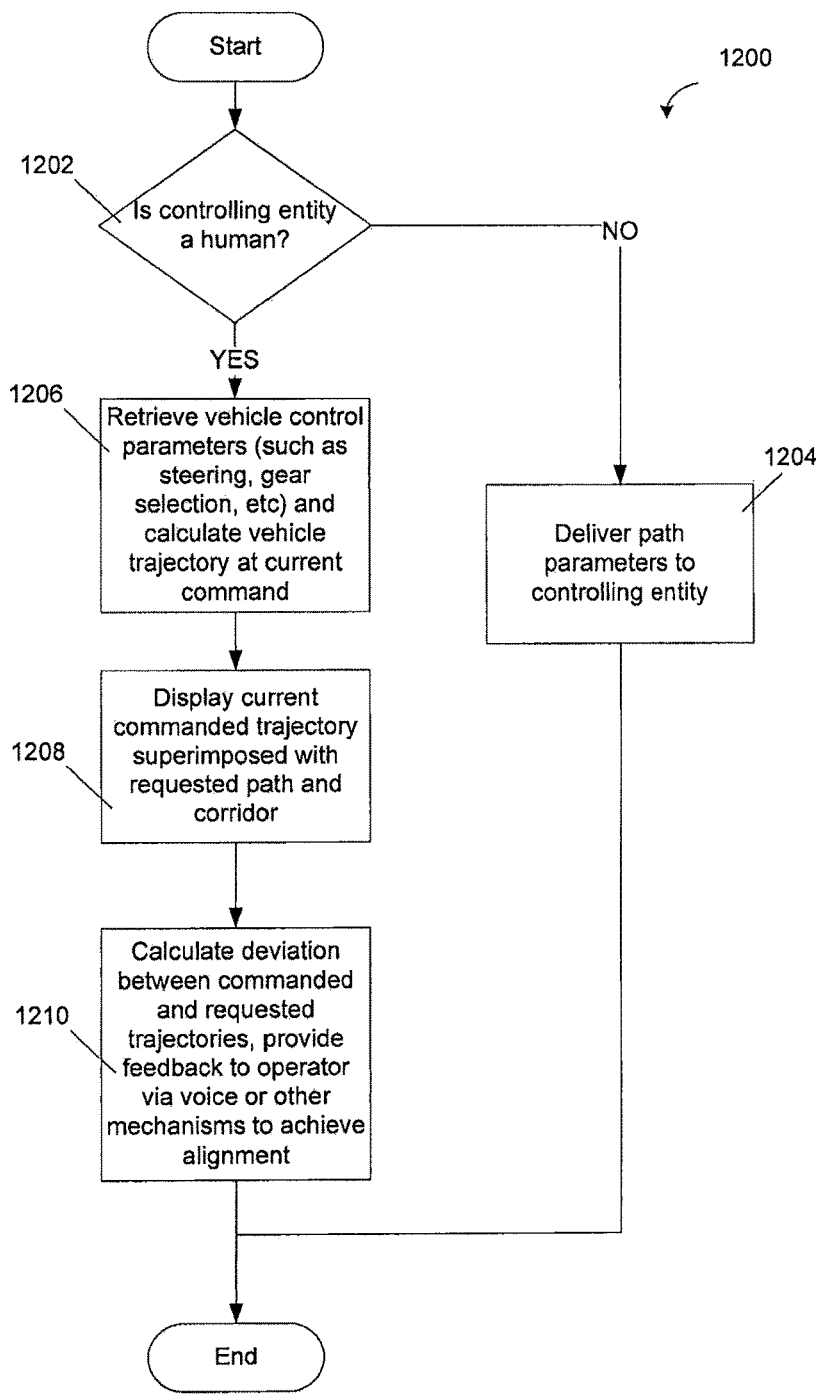

Returning to FIG. 6, after generating a suitable path to the target, in step 612 the system issues vehicle control orders and begins monitoring vehicle movement to provide feedback to an operator of the vehicle (if present). FIG. 12 is a flow chart showing a series of steps 1200 that may be undertaken to complete step 612 of FIG. 6.

In step 1202, the system first determines whether the vehicle is operated by a human driver, or if the vehicle is autonomous. If the vehicle is autonomous, in step 1204, the selected path is communicated to the vehicle control system. The controlling entity for the autonomous vehicle can then use the path to navigate the vehicle to the selected target.

If, however, the vehicle is controlled by a human driver, the system retrieves the vehicle condition parameters and calculates the vehicle's trajectory in step 1204.

In step 1208, the system analyzes the current position of the vehicle and the selected path and determines a feedback trajectory that would cause the vehicle to follow the path. If, for example, the vehicle has deviated from the path, the system would display a feedback trajectory for the operator that would cause the vehicle to return to the path in an efficient and safe manner.

In step 1210, the system identifies any existing deviation between the vehicle's current trajectory and the trajectory determined in step 1208. Using the vehicle condition data (e.g., turning radius, stopping distance, etc.) the system then determines whether any detected deviation is so great that the vehicle will be unable to return to the selected path based upon the vehicle's performance capabilities. For example, the vehicle's turning radius may be too great to return the vehicle to the selected path. In that case, the system can generate an error warning to the operator that the vehicle cannot return to the selected path. The operator can then restart the path selection process to generate a new path, or the system may automatically generate a new path. In some cases, the operator may have to navigate the vehicle away from the selected target to provide enough room for a new suitable path to be identified.

When warning the vehicle operator regarding deviations from the selected path, the present system may use any suitable user interface device for communicating such information. Heads up displays or other device display screens, warning sounds, voice cues, or other indicators can all be used to provide feedback to the operator.

Returning to FIG. 6, after generating the feedback trajectory, the system enters a control loop that allows the system to continually monitor the position and trajectory of the vehicle and generate feedback information that allows the vehicle to proceed down the selected path. In step 614, the operator of the vehicle (either autonomous or human driven) controls the vehicle for a predetermined period of time in step 614. After that time period elapses, the system evaluates the vehicle's current position and heading in step 616. In evaluating the vehicle's current position, the system can use a position sensor (e.g., position sensor 302 of FIG. 3) to identify the vehicle's current position and orientation. In some cases, though, where externally-mounted object detection systems are positioned around the selected target, as the vehicle gets close to the target, the vehicle can begin communication with the object detection systems to gather additional data describing the vehicle's current position and orientation. The data received from the vehicle-mounted position sensor can then be combined with the data received from the external system to generate more accurate position and orientation data. At that time, the system may also access the hazards and boundaries database to ensure that no new hazards have been created, or that hazards have not moved into the path of the vehicle.

In step 618, the system evaluates whether the vehicle has reached the selected target destination. If not, in step 620, the system evaluates whether the vehicle's current path and heading are within acceptable tolerances. If so, the system returns to step 612, analyzes the current vehicle position, heading, and the selected path and displays a new feedback trajectory to assist the vehicle operator in navigating along the path. Depending upon system implementation, the feedback information may instruct the vehicle operator to turn the vehicle's steering wheel by a particular amount to navigate back to the path. The system can also advise the driver to apply the brakes to slow the vehicle, or to undertake other maneuvers that are configured to return the vehicle to the path.

If the vehicle's current path and heading are not within acceptable tolerances, the system returns to step 610 and recalculates a new path to guide the vehicle to the selected target.

When the vehicle's position as determined in step 616 is determined to match the selected target's position, the vehicle is considered to have arrived at the target destination. Accordingly, step 618 has been satisfied and the system moves to step 622 to complete the maneuver. In step 622, the maneuver is completed and data collected during the maneuver can be stored for later analysis.

For example, during a particular maneuver, the system may periodically record the current position and heading of the vehicle, the current path, and information describing the current hazards and boundaries. That information can then be packaged and stored with metadata identifying the vehicle operator, current time, vehicle condition data, target information (e.g., target vehicle identification), and logical position. The dataset can then be stored in an offline system for review.

In some cases, because a vehicle cannot navigate directly into a target destination, a number of reverse points may be defined in close proximity to target destinations. The reverse points can be selected to allow a vehicle operator, for example, to execute a controlled turn before backing into a particular target destination. The reverse points may be particularly useful, for example, when a haul truck wishes to navigate into position beside a shovel for receiving material.

Figure 13:
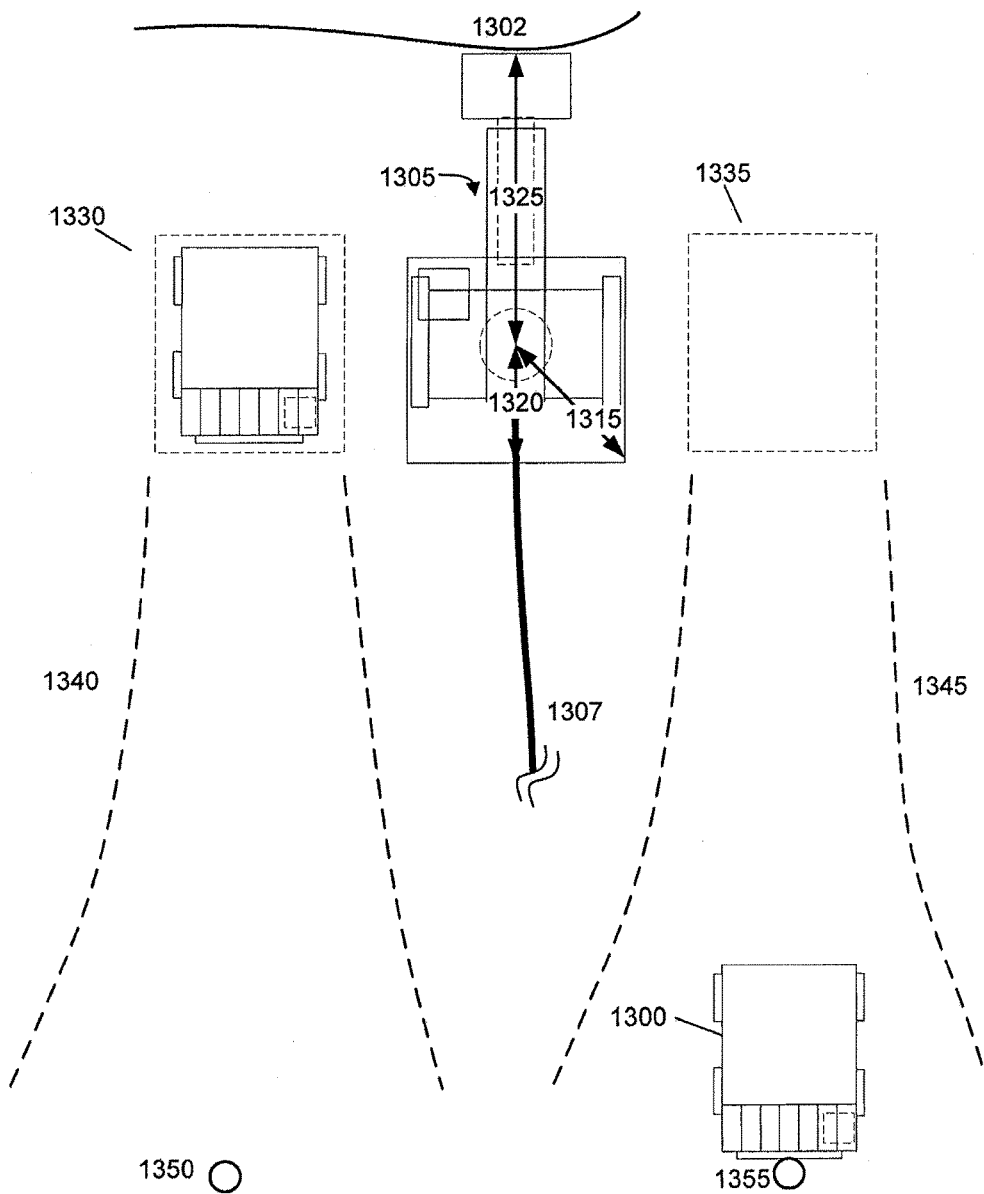
FIG. 13 shows an example use of the present system to assist trucks in entering and leaving loading areas defined proximate to a shovel.

FIG. 13 shows an example use of the present system to assist trucks in entering and leaving loading areas defined proximate to shovel 1305. The arrangement of FIG. 13 shows a power shovel 1305 positioned at a face 1302 for loading operations. Because the shovel can swing back and forth, there are two possible target destinations 1330 and 1335 that would allow a truck to position itself beside shovel 1305 to receive material.

In identifying the possible loading positions, there are a number of shovel-related parameters of interest that are helpful when devising a guided loading scheme. The most significant parameter is the shovel's location which can be measured directly by a GPS receiver or calculated on the basis of known dimensions of the shovel and the location of the GPS antenna. Additional useful parameters are the tail drag radius 1320, the corner drag radius 1315, and the boom radius 1325. These parameters set the outside envelope for the space the shovel will occupy during loading operations, and represent an area outside of which the loading positions must be located. These parameters are illustrated in FIG. 13 with reference to the center of rotation of the upper assembly of shovel 1305.

According to methods of the invention, two loading envelopes 1330 and 1335 are defined. The loading envelopes define the space in which haul trucks can be positioned prior to the commencement of loading. By defining loading positions on either side of shovel 1305, the loading of haul trucks can be made more efficient because shovel 1305 is not required to wait for access to a fresh haul truck. Instead, shovel 1305 can swing around to the new haul truck located on the other side of shovel 1305. Loading envelopes 1330 and 1335 are defined to be outside of the arc defined by the tail and/or corner of the shovel, but within the reach of the bucket. The size and orientation of the loading envelopes 1330 and 1335 can vary depending on the make and model of the haul truck, which determines the size and height of the truck bed.

Loading paths 1340 and 1345 are also defined, as described above. Loading paths 1340 and 1345 demarcate the acceptable space in which a haul truck may travel as it backs into a loading envelope. Loading paths 1340 and 1345 will generally be wider the farther the truck is from the loading envelope, requiring increasing precision as the truck nears the loading envelope. Additionally, loading paths 1340 and 1345 are defined in areas free of hazards or other no-go areas, for example, the area occupied by a dragline tether 1307 or overhead power cables.

Systems according to the invention also define reverse points 1350 and 1355. Reverse points 1350 and 1355 are the regions to which a haul truck can navigate prior to beginning its reverse movement along the loading paths 1340 and 1345 to the loading envelopes 1330 and 1335.

Loading envelopes 1330 and 1335, loading paths 1340 and 1345 and reverse points 1350 and 1355 can be defined in, for example, a distributed objects data or can be generated on-the-fly by a navigation system such as system 300 described above with respect to FIG. 3. The locations of these various features (e.g., loading envelopes 1330 and 1335, loading paths 1340 and 1345, and reverse points 1350 and 1355) are accessed by the system (e.g., system 300 of FIG. 3).

After identifying the various features, a navigation aid (e.g., navigation aid 322 of FIG. 3) accesses the features and uses them to guide mine haul trucks into position according to methods described above (see, for example, FIG. 6-12). Additionally, the central application can assign one of the two reverse points 1350 and 1355 to a given truck as part of a haul truck dispatch system. For example, when the central application is aware that a first truck is located at a first loading envelope 1330, a second truck is given a second reverse point 1355 as a waypoint to which to navigate. Reverse points 1350 and 1355 are generally assigned to trucks heading to shovel 1305 in an alternating sequential manner depending on expected time of arrival.

Figure 14:
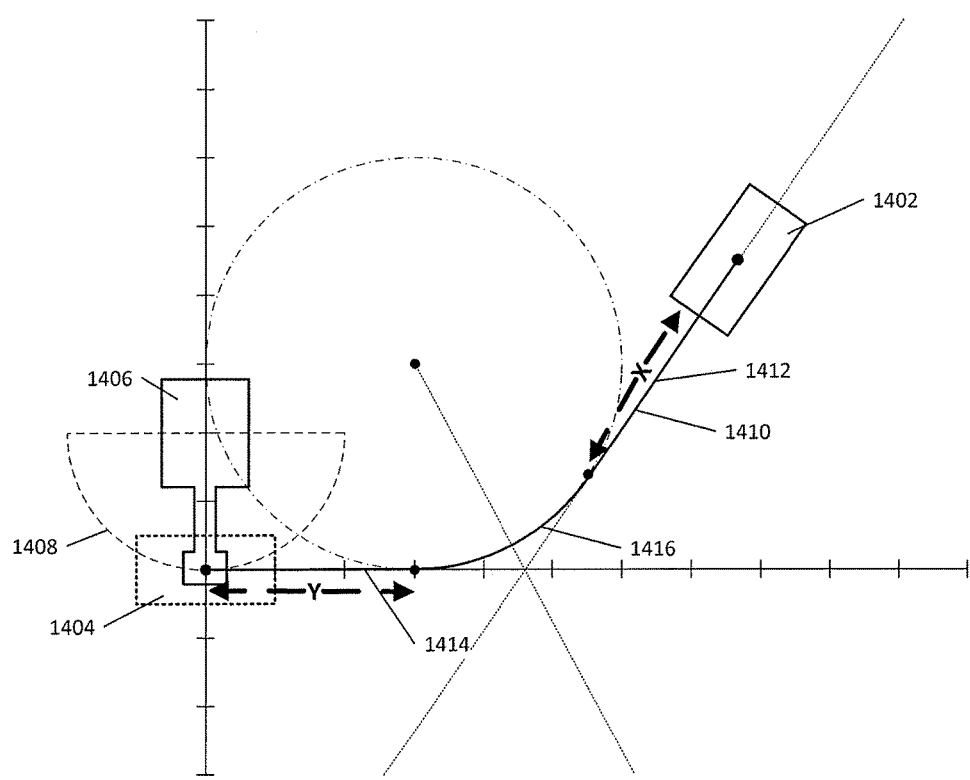
FIG. 14 is a diagram depicting an example approach for calculating a path to navigate a vehicle to a target destination or region.

When assisting a vehicle in navigating into a particular target destination or region, a number of different approaches may be utilized to calculate a path for the vehicle to take to the target destination. To illustrate, FIG. 14 shows an example approach for calculating such a path. FIG. 14 depicts vehicle 1402 and target region 1404 positioned nearby, for example, shovel 1406. As illustrated, shovel 1406 has a swing arc 1408. As such, target region 1404 could have been positioned at any point along swing arc 1408 of shovel 1406 enabling shovel 1406 to deposit material into vehicle 1402 or retrieve material there from. In various shovels, the radius of swing arc 1408 can be adjusted—that is, the shovel may have an adjustable reach, referred to as shovel crowd. Depending upon the desired manner of operating the shovel, a shovel operator may at times choose to load trucks "tight", or closer to the shovel, usually due to narrow pit geometries. Varying the swing arc radius could be performed manually or automated, such as with LiDAR scanning of the loading area.

The location of target region 1404 along the swing arc 1408 of shovel 1406 could be determined based upon many factors. For example, target region 1404 may be positioned so as to avoid hazards or other obstacles that are in the vicinity of shovel 1406. Alternatively, target region 1404 could be selected so as to minimize the distance that vehicle 1402 must travel in order to interact with shovel 1406 or to minimize the amount of rotation that shovel 1406 must perform in order to interact with vehicle 1402. In some cases, the target region may be set manually by an operator of shovel 1406, an operator of vehicle 1402, or a third party. In some cases, target region 1404 is selected to minimize a distance between target region 1404 and the point at which the shovel is digging (i.e., the dig point). Such an approach may reduce shovel swing time by minimizing swing distance and/or prevent contention by ensuring the truck is tucked away from travel areas on narrow benches. Alternatively, target region 1404 may be selected to maximize a distance between target region 1404 and the shovel's dig point. Such an approach may reduce the likelihood of shovel bucket and vehicle 1402 collisions by allowing a safe distance for the shovel to raise the bucket, reduce the likelihood of truck tire damage by maintaining distance from the face and dig point, reduce spotting time by minimizing truck reversal distance, and/or reduce shovel and vehicle 1402 collision potential by minimizing vehicle 1402 travel near the shovel. In various embodiments target region 1404 location may be selected to balance safety practices and operational priorities, e.g. to minimize swing distance while maintaining X distance from face and Y distance from dig point. The size of target region 1404 could be determined by a number of factors, including the size or configuration of vehicle 1402.

After the target region 1404 is identified, any suitable algorithm may be used to calculate path 1410 for vehicle 1402. The path may be made up of a single continuous line defined through the environment in which vehicle 1402 and shovel 1406 operate. Alternatively, path 1410 may be made upon a finite number of points between vehicle 1402 and shovel 1406. Path 1410 may be calculated once at the beginning of the movement of vehicle 1402, or could be continuously updated and evaluated as vehicle 1402 moves towards shovel 1406 or target region 1404.

In one embodiment, path 1410 may be calculated so that it is primarily made up of straight lines and constant-radius arcs. The path may also be optimized to limit turn radius and minimize turning buffer distance. In one embodiment, when constructing path 1410, a maximum arc radius is used. This can minimize the severity of necessary turns, thereby reducing tire and steering wear. However, other embodiments could emphasize a minimum arc radius to reduce the total non-linear travel distance for benefits of visibility and/or safety.

When calculating path 1410 algorithms may be utilized to reduce wear on tires and steering components by preventing vehicle 1402 from being required to turn its wheels while stationary. To preventing tire rotation in a stationary vehicle 1402, the algorithm may assume an operator of vehicle 1402 accelerates in some normal fashion and would have achieved an acceptable speed after traveling distance X or Y. Alternatively, this requirement could be met using other methods as well. For example, vehicle 1402 speed could be monitored and arc 1416 not calculated until a minimum speed is achieved.

In constructing the path, two linear segments are first defined. The first linear segment 1412 extends from vehicle 1402 along its current trajectory for a distance x. The second linear segment 1414 extends for a distance y from target region 1404 in the direction from which a vehicle navigating into target region 1404 should enter. Both linear segments may be configured to allow vehicle 1402 to begin moving before being required to provide a steering wheel input, thereby preventing wheel rotation in a stationary or near-stationary vehicle 1402. In one embodiment, the distance y represents a minimum safe distance that a vehicle should be from shovel 1406 before attempting complex maneuvers. Alternatively, distance y may be defined to allow the vehicle to slow down below a minimum steering speed without having to turn. The lengths of both line segments x and y could be determined based on a combination of safety and vehicle operational practices.

Having determined both linear segments 1412 and 1414, arc 1416 is constructed to connected the end points of each of linear segments 1412 and 1414. The configuration of arc 1416 (e.g., the arc radius) can be optimized to a minimum arc radius, maximum arc radius, or variations thereof based upon considerations for tire wear, safety and vehicle limitations such as turn radius. The embodiment shown in FIG. 14 depicts arc 1416 having a maximum arc radius.

With path 1410 calculated, vehicle 1402 can navigate along path 1410 to reach and enter target region 1404. To assist an operator of vehicle 1402 in navigating along path 1410, a number of human/machine feedback interfaces can be provided to inform the operator of his or her progress along path 1410. The feedback interfaces could begin providing feedback to the operator based upon any triggering criteria such as a manual operator input, proximity of vehicle 1402 to target region 1404, a heading deviation away from target line 1414, entry into a polygon defined around target region 1404 or proximity to a beacon that is, itself, in proximity to or located within target region 1404, or vehicle 1402 being place into reverse.

Similarly, a number of different criteria may be defined upon which the feedback interfaces ceases to provide operator feedback. Example criteria include arrival of vehicle 1402 at or within target region 1404, departure of vehicle 1402 from a polygon defined around target region 1404 or from a beacon that is, itself, in proximity to or located within target region 1404, or forward travel of vehicle 1402 by a threshold distance.

Figure 15:
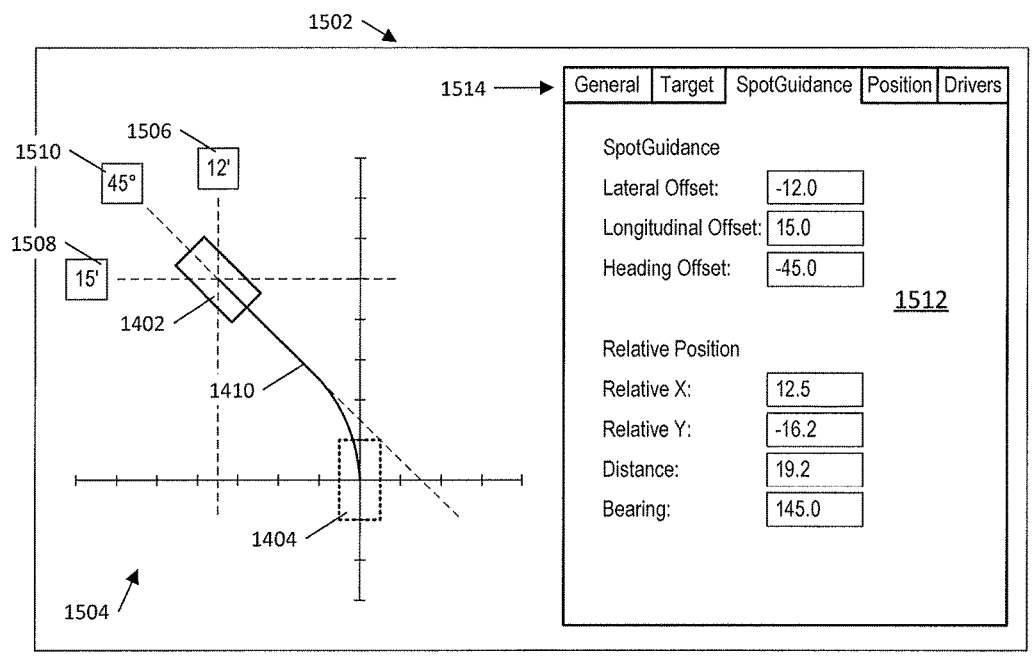
FIG. 15 depicts a user interface that may be incorporated into a display to provide feedback to an operator of a vehicle.

FIG. 15 shows an example user interface 1502 that may be depicted on a display to provide feedback to the operator of vehicle 1402. User interface 1502 may be provided via any suitable device, such as a laptop or tablet computing device mounting within a cockpit of vehicle 1402. As described below, the device may be coupled to a number of other devices and systems configured to calculate path 1410, continuously monitor and identify a position and a heading of vehicle 1402, and determine a location of target region 1404.

User interface 1502 includes graphical depiction 1504 which illustrates the relative positions of vehicle 1402 and target region 1404 within their operational environment. Depending upon the implementation, graphical depiction 1504 could show additional information as well, such as other vehicles in the vicinity, hazards, systems, and the like.

To provide additional feedback to the operator of vehicle 1402, display 1504 also provides the operator with a description of the relative position of vehicle 1402 to target region 1404. In this example, the distance between vehicle 1402 and target region 1404 in the x-direction or lateral offset 1506 and the y direction or longitudinal offset 1508 are provided. Additionally, display 1504 shows the angle 1510 between the current heading of vehicle 1402 and the angle at which target region 1404 should be entered. Additional information can be provided in tabular format within window 1512. The interface also provides a number of tabs 1514 that can be selected by vehicle 1402 operator to learn more information about the target destination 1404, the current location data for vehicle 1402, and information about the operator of vehicle 1402 and other vehicle operators within the vicinity of vehicle 1402.

Figure 16:
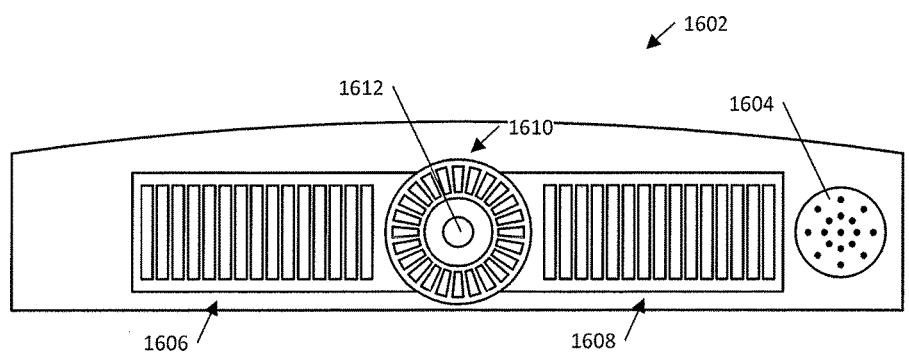
FIG. 16 depicts a display that may be mounted within a vehicle to provide feedback to an operator of a vehicle.

Display 1502 is relatively verbose and contains a lot of information. As such, the information contained within display 1502 can be utilized to drive a simplified display contained a minimal amount of information required to successfully navigate vehicle 1402 towards target region 1404. FIG. 16 illustrates such an example display.

The display of FIG. 16 could be mounted, for example, over or near a steering wheel of vehicle 1402 enabling an operator of vehicle 1402 to easily look towards the display to quickly gather information necessary for navigating vehicle 1402. Display 1602 includes a number of light indicators that can be illuminated to provide the operator with information regarding the current position and heading of vehicle 1402 with respect to a target region. Display 1602 may also include a speaker 1604 that can be used to sound audible alerts for a number of situations. Example situations where an audible alarm may sound include an imminent collision with an object within the vicinity of vehicle 1402, a deviation of the vehicle from the designated path to such a degree that the vehicle cannot return to the path, entry of the vehicle into the target destination, and the like.

Display 1602 includes left and right banks of lights 1606 and 1608, respectively. These banks of lights can be used to indicate a deviation of vehicle 1402 away from a target destination in a direction along a particular axis. For example, the deviation may be measured along an axis that runs perpendicularly through a line extending away from the target destination in a direction from which a vehicle should enter the target destination. Different numbers of either lights 1606 or 1608 may be illuminated to illustrate a magnitude of the deviation. In various other embodiments, the lights may be illuminated with different colors or intensity to show the deviation.

To determine the number of lights 1606 or 1608 to be illuminated a metric is compared against a set of ranges which determines the state of each lights 1606 or 1608. The criteria may result in illuminating a single segment or group of segments. For example, lights 1608 may be used to represent how far vehicle 1402 is to the right of the target line, referred to as lateral offset. Lights 1608 can be configured such that any lateral offset less than 0.5 meters will not illuminate any part of lights 1608, and that any offset greater than 7.5 meters will illuminate the entirety of lights 1608. Between lateral offsets of 0.5 meters and 7.5 meters, segments of lights 1608 are illuminated for 0.5 meter intervals of lateral offset from left to right. So, for a metric of 0.7, the leftmost segment is lit. For a metric of 4.2, the leftmost six segments are lit. And so on. This logic is reversed to handle negative lateral offsets for illuminating on one or more of lights 1606.

A central ring 1610 of lights can be used to indicate the angle 1510 between the current heading of vehicle 1402 and the angle at which target region 1404 should be entered. In other embodiments, central ring 1610 ma be utilized to depict a desired steering wheel position for the vehicle. Accordingly, given some means for the operator to reference the actual steering wheel position (such as a tag or mark at one point on the wheel), central ring 1610 may be used to depict desired steering wheel position. Furthermore ,with an appropriate vehicle model and steering sensor, this position could be linked with the desired motion of vehicle 1402.

In one embodiment, central ring 1610 is used to indicate the difference between the target heading and the current vehicle heading (i.e., heading offset). In the present example, central rig 1610 includes 24 segments, each representing 15 degree intervals. The uppermost segment represents a difference between target heading the current vehicle heading of 357.5 deg to 7.5 deg, and segments moving clockwise move up by 15 degree intervals. Unlike lights 1606 and 1608, only a single segment is active at a time, matching the heading offset, rather than a set of segments.

A central light 1612 maybe selectively illuminated when the vehicle is on target and successfully navigating along the desired path to the target destination. Accordingly, central light 1612 may be illuminated when both heading offset and lateral offset are within an acceptable threshold. For example, if vehicle 1402 is experiencing a lateral offset of 0±0.5 m and a heading offset >359 or <1 deg central light 1612 may be illuminated. If either of the heading offset or lateral offset are outside those boundaries, central light 1612 would not be illuminated.

When configuring both lights 1606 and 1608, central ring 1610, and central light 1612, the handling of rounding and/or boundary conditions for lateral and heading offset may be varied by design.

Although display 1602 is configured to be mounted nearby a steering wheel of vehicle 1402, in many cases, particularly when vehicle 1402 is being reversed, the vehicle operator is not looking over the steering wheel and will instead be looking into either of the vehicle's two side or wing mirrors. In that case, one or more display devices can be incorporated into the vehicle's side mirrors to provide guidance and feedback to the vehicle operator as the vehicle navigates along a path to a target destination.

In some cases, various visual display elements may be incorporated into a vehicle's side mirrors to provide vehicle operator feedback. For example, a number of lights or otherwise selectively illuminateable features may be positioned about a perimeter of one or more of the vehicle's side mirrors. In that case a region, such as a central region of the one or more mirrors, may be left reflective allowing the vehicle operator to view a portion of the perimeter of the vehicle in a conventional manner.

By illuminating one or more of the lights disposed around a perimeter of the mirror, feedback can be provided to the operator informing the operator of information such as the vehicle's current position with respect to a target destination and recommended steering inputs for navigating to the target destination. In an emergency situation, all of the lights may illuminate or flash to indicate that the vehicle should be stopped as quickly as possible.

Different combinations of lights and illumination colors can be utilized to indicate a current heading of the vehicle with respect to a target destination. For example, a single light may be illuminated in a particular color (e.g., green) and may indicate a current heading of the vehicle. A cluster of other illuminated lights may be illuminated in a different color (e.g., red) and indicate a current heading towards the target destination. As the vehicle's heading changes, different lights may be illuminated to indicate the different heading of the vehicle. When the lights indicate that the target destination heading is offset from the current heading of the vehicle, a vehicle operator would quickly learn to adjust the vehicle's steering wheel to correct this deviation.

In yet other embodiments, the vehicle's mirrors may include selectively illuminated messages embedded within the reflective surface of the mirror. These in-mirror images or messaged may be implement by placing a light source depicting the image or message in a dark cavity behind the glass of the mirror. When the glass is silvered, a reduced reflective coating is applied to some or all of the mirror, allowing transmission of some light from the light source behind the glass, but showing normal reflection when the light source is disabled. The transmitting area may be the entire mirror, a particular section, or a specific symbol, depending on what is being shown behind it.

These various mirror configurations may be implemented within both side view mirrors of the vehicle. Both the left and right mirror may be implemented in the same manner. Or, in some cases, the left and right mirror configurations may be different. In such a case, because the left and right mirrors are located at different distances from the vehicle operator, the mirror configurations may be different to compensate for the differences in viewing distance and viewing angle. For example, the lights or any symbols embedded within the various mirrors may be larger or brighter, or both, in the mirror that is further away from the vehicle operator. In some vehicles, one mirror may be four times further away than another mirror. In that case, the mirror that is four times further away could include display elements that are four times larger making them easier to be observed by the vehicle operator.

Similar collections of lights and indicators could be installed about any of the mirrors positioned about vehicle 1402 to assist an operator in viewing at least a portion of the environment about vehicle 1402. Similarly, to the extent conventional side and rear view mirrors are replaced (or supplemented) in a vehicle by combinations of video cameras and video displays, the display viewed by the vehicle operator could either incorporate similar lighting arrangements (either incorporated within the video information itself or in a separate structure mounted about the video display) to provide heading information for the vehicle and the target destination as well as alert or alarm information.

In various embodiments, the present guidance system can provide assistance to a vehicle operator that must execute a two-step maneuver when navigating the operator's vehicle to a target destination. For example, in some situations a particular target destination should only be entered by a vehicle traveling in reverse. In that case, the operator first needs to navigate into the general vicinity of the target destination in a first maneuver with the back of the vehicle pointing generally towards the target destination. Then, the operator can execute a second maneuver in which the vehicle is reversed into position beside the shovel.

To illustrate, FIGS. 17A-17D depict an environment in which vehicle 2100 executes a two-step maneuver into a target destination or region 2102 positioned besides shovel 2104. As described herein, the location of target destination 2102 along the swing arc of shovel 2104 can be selected by any suitable mechanism and may be determined by any characteristic of the vehicle 2100, shovel 2104, or other factors. The target destination 2102 is restricted in that vehicle 2100 should enter target destination 2102 traveling in reverse. As such, the operator of vehicle 2100 is required to execute a two-step maneuver.

At each stage in the maneuver depicted in FIGS. 17A-17D, FIGS. 18A-18D depict a corresponding display 2200 that may be presented a driver of vehicle 2100 to assist with the maneuver. Display 2200 includes left and right indicators 2202 and 2204, respectively, that indicate the degree to which vehicle 2100 is offset from target destination 2102 horizontally (see distance 'x' shown on FIGS. 17A and 17C). The size of the black region in either of displays 2202 or 2204 indicates the distance by which the vehicle 2100 position is offset from the position of target destination 2102. The size of displays 2202 or 2204 may be modeled as an infinite series of different light segments, such as those found in lights 1606 and 1608 described above. As such, if, for example, the range for display 2204 is set as 0.5 (no black region) to 10 m (full black region), and the lateral offset is 5.67 m, the leftmost 56.7% of the bar is filled in.

Figure 17A:
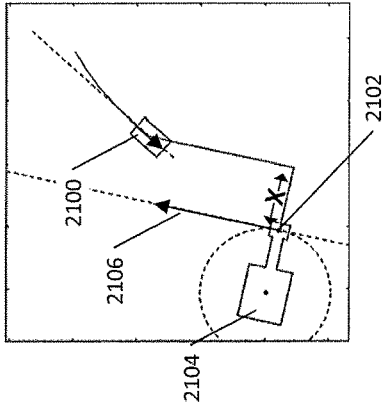
FIGS. 17A-17D depict an environment in which a vehicle executes a two-step maneuver into a target destination or region positioned besides a shovel.

An alignment indicator 2206 depicts the degree to which the current orientation of vehicle 2100 aligns with the desired orientation of a vehicle at the target destination 2102 (indicated by dashed line 2106 in FIG. 17A). The orientation of vehicle 2100 is defined by a vector extending out of vehicle 2100 in a direction towards the front of vehicle 2100. This vector is illustrated in FIGS. 17A-17D by the arrow depicted within vehicle 2100.

Within indicator 2206, vertical lines 2208 represent the desired orientation of a vehicle positioned within target destination 2102. Vertical lines 2208 are generally static within indicator 2206. Line 2210 represents the current orientation of vehicle 2100 with respect to the desired orientation indicated by lines 2208. Accordingly, as vehicle 2100 rotates within the environment, line 2210 will move about indicator 2206 to represent the changing relationship between the orientation of vehicle 2100 and the desired orientation of a vehicle at target destination 2102. In the example shown in FIGS. 18A-18D line 2210 being in its left-most oriented position indicates that the orientation of vehicle 2100 is offset from the desired orientation by 90 degrees in the counterclockwise direction. Conversely, line 2210 being in its right-most oriented position indicates that the orientation of vehicle 2100 is offset from the desired orientation by 90 degrees in the clockwise direction.

In the scene depicted in FIG. 17A, vehicle 2100 is driving forwards towards target destination 2102. As shown, the position of vehicle 200 is offset to the right from target destination 2102 (see dimension 'X'). As such, right indicator 2204 is at least partially illuminated to depict that offset. The orientation of vehicle 2100 (depicted by the arrow placed within vehicle 2100) is offset from the desired vehicle orientation at target destination 2102 (depicted by line 2106) by an angle that is greater than 90 degrees in the counterclockwise direction. As such, indicator 2206 does not depict line 2210.

Figure 17B:
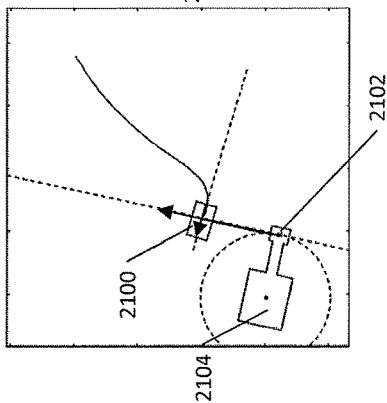

In the scene depicted in FIG. 17B, vehicle 2100 has begun turning in order to be positioned at a suitable point nearby shovel 214 at which to begin reversing towards target destination 2102. At this point, vehicle 2100 is in-line with target destination 2102 horizontally, so neither of indicators 2202 and 2204 generate an output. Additionally, the orientation of vehicle 2100 is approximately 90 degrees offset from the desired vehicle orientation at target destination 2102, so indicator 2206 depicts line 2210 in approximately its left-most position.

Figure 17C:
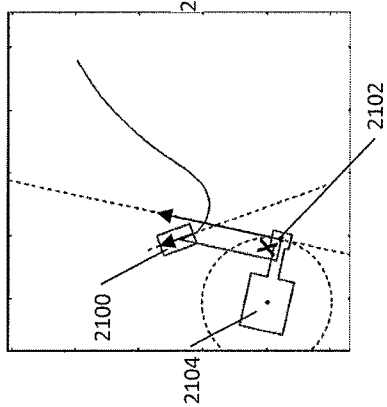

In the scene depicted in FIG. 17C, vehicle 2100 has begun reversing towards target destination 2102. At this point, vehicle 2100 is slightly offset from target destination 2102 in the horizontal direction, resulting in left indicator 2202 being at least partially illuminated. This provides the operator of vehicle 2100 with a notification of that offset allowing the operator to make suitable corrections. Additionally, the orientation of vehicle 2100 is approximately 30 degrees offset from the desired vehicle orientation at target destination 2102 in the counterclockwise direction, so indicator 2206 depicts line 2210 in a position indicating that offset. Again, the operator can utilize the depiction of line 2210 to make suitable corrections to the orientation of vehicle 2100 as the reversing maneuver is undertaken.

Figure 17D:
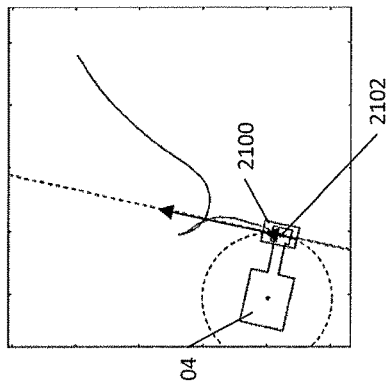
Figure 18A:
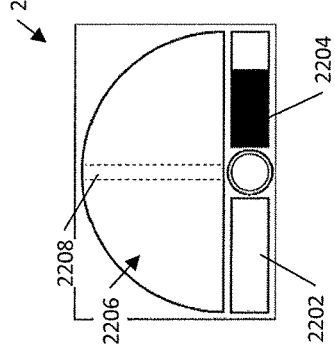
FIGS. 18A-18D depict displays that may be presented a driver of a vehicle to assist with the maneuver illustrated in FIGS. 17A-17D.
Figure 18B:
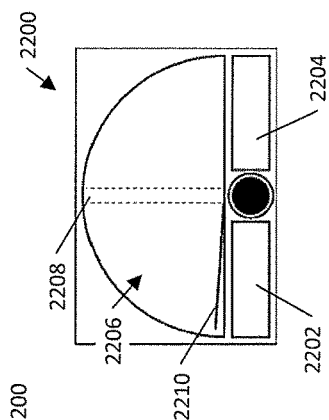
Figure 18C:
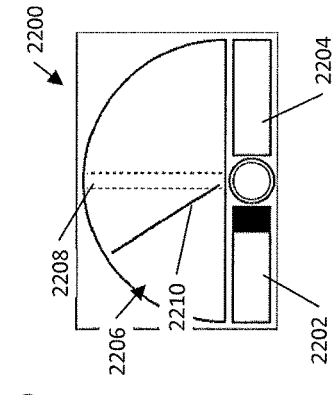
Figure 18D:
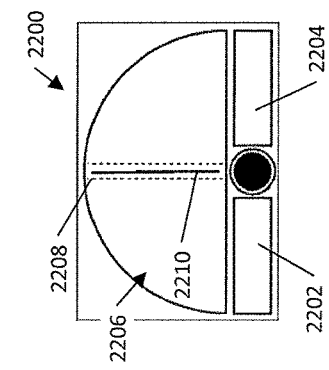

Finally, in the scene depicted in FIG. 17D, the reversing maneuver has been completed and vehicle 2100 is located at target destination 2102. In this position, the location of vehicle 2100 is not offset horizontally from target destination 2102. As such, neither indicator 2202 nor indicator 2204 generates an output. Additionally, the orientation of vehicle 2100 aligns with the desired vehicle orientation at target destination 2102. As such, line 2210 (representing the vehicle's orientation) aligns with vertical lines 2208 (depicting the desired alignment).

Figure 19:
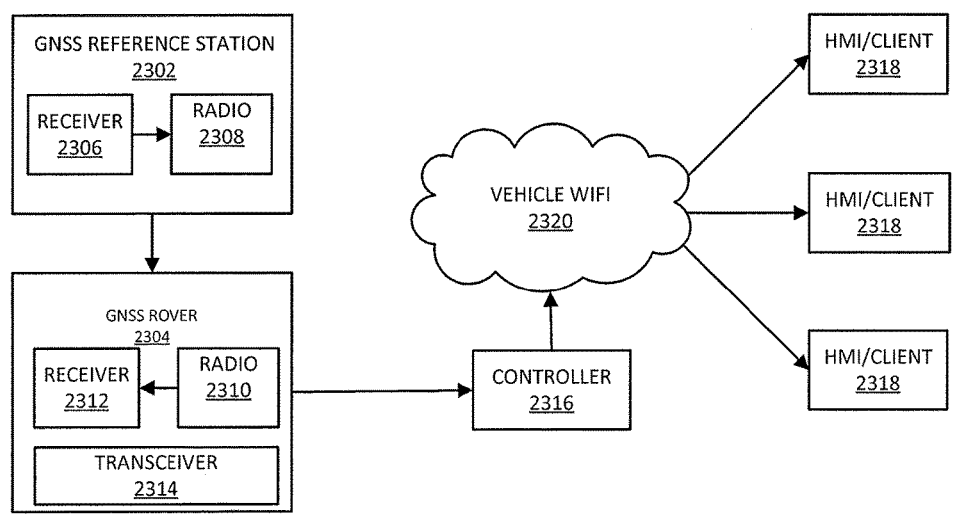
FIG. 19 is a block diagram illustrating functional components of the present driver guidance system.

FIG. 19 is a block diagram illustrating functional components of the present driver guidance system. As described above, the system can be configured to provide feedback directly to an operator of a vehicle (e.g., either a human operator or an autonomous operator) to assist in or facilitate navigation of vehicle, such as a mining haul truck, to a target destination (e.g., a point in space) or into a target area (e.g., a two-dimensional or three-dimensional volume into which the vehicle or a portion of the vehicle may be navigated).

In FIG. 19, the system utilizes a combination of one or more Global Navigation Satellite System (GNSS) reference stations 2302 and one or more GNSS rovers 2304 to provide accurate location data within a particular environment, such as a mining environment. In this implementation, GNSS reference station 2302 is positioned at a well-known location within the environment. The location of GNSS reference station 2302 can be accurately determined using any suitable technique, such as geodetic survey (referencing a known datum), or averaging observed position over an extended period of time.

GNSS reference station 2302 includes receiver 2306 configured to receive one or more externally-generated signal (e.g., a radio frequency (RF) signal) providing GNSS reference station 2302 with its location data. GNSS reference station 2302 also include radio 2308 configured to broadcast the location information for GNSS reference station 2302 using a known protocol. This enables GNSS reference station 2302 to operate as a beacon, continuous broadcasting its own well-known location data.

GNSS rover 2304 includes radio 2310 and received 2312 configured to receive and decode the beacon signals of one or more GNSS reference station 2302 positioned about the environment. GNSS rover 2304 can then analyze one or more of the beacon signals received via radio 2310 to determine an accurate location and orientation of GNSS rover 2304.

In various embodiments, GNSS rover 2304 may be mounted to the vehicle being navigated (e.g., a haul truck within a mine environment) so that once an accurate position and orientation are determined for GNSS rover 2304, the position and orientation of the vehicle can be inferred.

GNSS rover 2304 includes transceiver 2314. Transceiver 2314 is configured to communicate (via both transmission and reception) data with one or more components that may be mounted to the vehicle. In one embodiment, transceiver 2314 may be configured to implement a relatively low-power short range communication protocol, such as BLUETOOTH. But in other embodiments, any suitable data communication protocol or technology, including both wired and wireless approaches, may be utilized.

Using transceiver 2314, GNSS rover 2304 is configured to transmit its location data to controller 2316, which is also located on or in the vehicle. In various embodiments, controller 2316 may be a mobile computing device, such as a laptop or tablet device. Controller 2316 may or may not provide a display screen or other user interface devices. Controller 2316 is configured to receive the location data from GNSS rover 2304. Controller 2316 may also be configured to access one or more database storing positional and other attribute data for a number of entities within the environment. An example of such a database includes distributed objects database 304, described above. Controller 2316 is then configured to determine a target destination or target region for the vehicle. As discussed above, this determination may involve analysis of the location, activity, and status for a number of vehicles, systems, and other objects within the environment. The target destination or space may be determined based upon attempts to optimize the activities and/or location of the vehicle and may be determined by the current location and activity of one or more other vehicles within the environment. In some cases, an operator of the vehicle may select or designate a particular target destination or region. In other cases, an operator of a remote vehicle or system (or an individual or system overseeing the environment) may select or designate a particular target destination or region.

After a suitable target destination or region is identified, controller 2316 analyzes both the location and orientation of the vehicle as well as the position of the target destination or region. Controller 2316 can then calculate or determine a path or route that the vehicle can navigate to get to the target destination or region. As discussed above, the path may represent one or more points that the vehicle can navigate along to reach the target destination or region. The path may be linear or curvilinear in that the path may be determined by geometrical analysis of the position and orientation of the vehicle to the target destination or region. In other cases, the path may be more complicated, calling for the vehicle to navigate about one or more hazards, other vehicles, objects, and the like, that may be positioned between the vehicle and the target destination or region.

Once determined, controller 2316 can cause feedback to be provided to the vehicle operator (either human or autonomous) in order to assist or facilitate the vehicle navigating to the target destination or region. The feedback can inform the operator as to the location of the vehicle with respect to the target destination or region. This may include both positional and heading or orientation feedback enabling the operator to correct any problems as the vehicle is navigated to the target destination or region. In various embodiments, the feedback can also provide instruction to the operator as to how the vehicle's steering wheel should be positioned. As the vehicle navigates towards the target destination or region, the steering information can be updated enabling the operator to proceed along an appropriate path. In some embodiments, the feedback may include graphical representations that show the position of the vehicle with respect to the target destination or region. The visual depiction may include one or more representations showing a suitable path that the vehicle may take to reach the target destination or region. The visual representations may also show other objects (e.g., hazards, vehicles, systems, etc.) that are located about the vehicle.

With reference to FIG. 19, the feedback can be provided via one or more human/machine interfaces 2318. The human/machine interfaces 2318 may be configured to communicate with controller 2316 via any suitable communication mechanism or network. In the embodiment shown in FIG. 19, a wireless network 2320 is installed within or about the vehicle to enable communication of data and information between controller 2316 and human/machine interfaces 2318.

Figure 20:
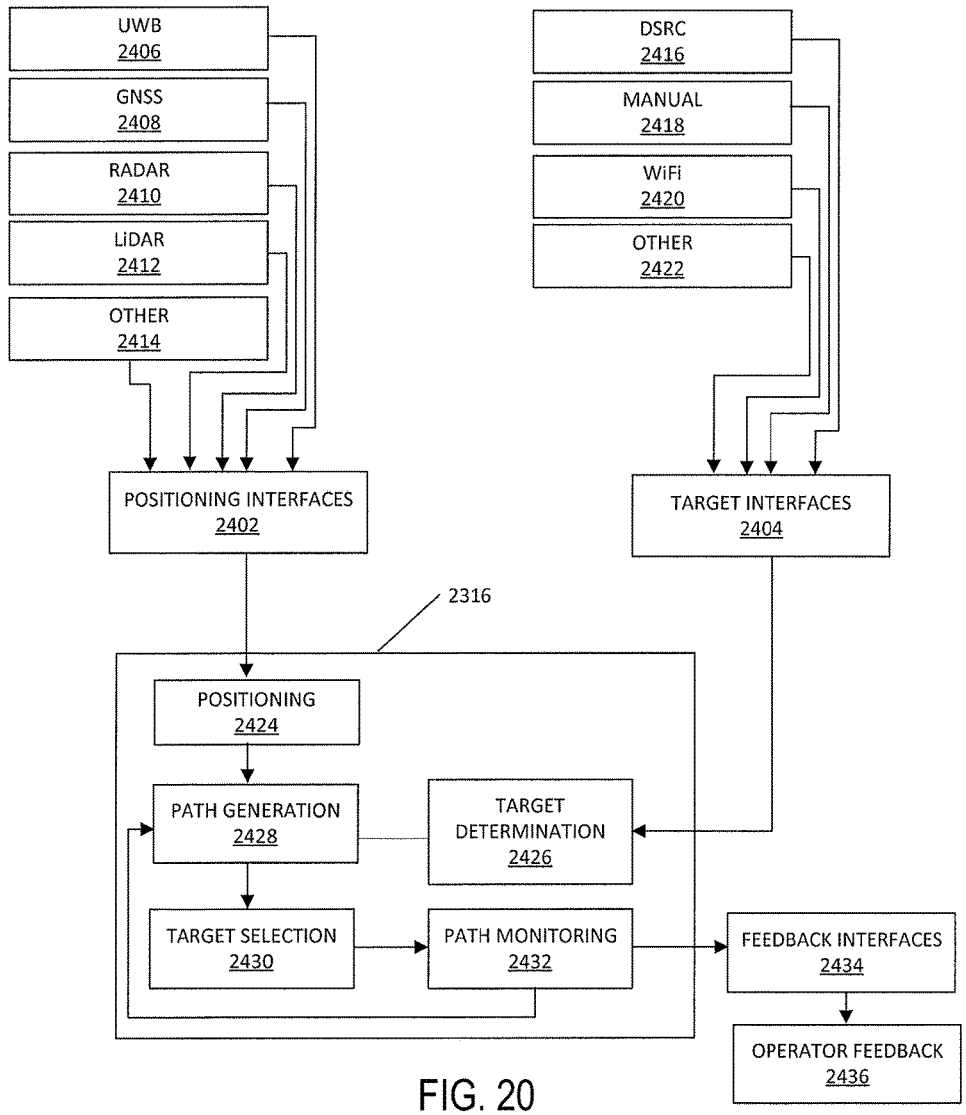
FIG. 20 is a block diagram illustrating functional components of a controller enabling the controller to determine a suitable target destination or region for the vehicle.

FIG. 20 is a block diagram illustrating functional components of controller 2316 enabling the controller to determine a suitable target destination or region for the vehicle and calculate an offset of the vehicle's current orientation and location. Controller 2316 includes two primary interfaces. Positioning interface 2402 is configured to receive positional or location data from a number of different sources. Target interface 2404 is configured to receive data from a number of sources that may be utilized to identify the target destination or region for the vehicle.

Positioning interface 2402 is configured to receive location data from a number of different sources including ultra wide band transmissions 2406, GNSS systems 2408, RADAR devices 2410, LiDAR 2412, and other systems 2414. Positioning module 2424 of controller 2316 is then configured to accumulate all data received via positioning interface 2402 to determine a location of the vehicle. This may involve, for example, combining some of the positional data together to determine the location. In some cases, some of the location data may be ignored and only utilized if one or more of the other location determining systems should fail or be unavailable.

In alternative embodiments, however, absolute position of the vehicle may not be required. Instead, systems like ultra-wide band, RADAR and LiDAR may give accurate relative position data (e.g., with respect to a target destination), not absolute global positions. If the vehicle can be positioned accurately relative to the shovel or target destination, and a target loading location is determined relative to the shovel, a guidance system can operate to guide the vehicle even without absolute vehicle position data.

Target interface 2404 pulls data from various sources including dedicated short-range communication (DSRC) interface 2416, which may provide adjacent vehicles with position, orientation and trajectory information about nearby vehicles, manual selection 2418 (e.g., either by the vehicle operator, an operator of another vehicle within the environment, or a manager of the environment), wireless data connections 2420, and other systems 2422. The data accumulated by target interface 2404 can then be analyzed by target determination module 2426 of controller 2316 to determine a suitable target destinations or regions for the vehicle.

After the vehicle's location is determined by positioning module 2424 and potential target destinations or regions are identified by target determination module 2426, controller 2316 executes a control loop including path generation module 2428, which is configured to calculate a path or trajectory to the target identified by target determination module 2426, target selection module 2430 which selects one of the target destinations or regions identified by target determination module 2426 as the vehicle' target, and path monitoring module 2432, which is configured to monitor the progress along the path calculated or determined by path generation module 2428. If path monitoring module 2432 should determine that the vehicle has deviated from the determined path, path generation module 2428 may be configured to calculate a new path. When selecting a target destination or region, target selection module 2430 may distinguish between multiple target destinations that are in close proximity. For example, a shovel may load trucks on both sides, or a crusher may have multiple bays. It is possible then that multiple target destinations meet the criteria to trigger driver feedback, and so a single target destination must be selected. As such, target selection module 2430 selects a particular target destination for the purpose of providing feedback. The selection process could consider a combination of operational rules, such as "Crusher A over Crusher B when available", safety rules, such as "Left shovel load location first" (e.g., to provider improved vehicle visibility when spotting), and efficiency rules, such as "shortest path" or "straightest path".

Path monitoring module 2432 may provide some output to one or more feedback interfaces 2434 that are coupled to one or more operator feedback devices 2436. As discussed above, operator feedback devices 2436 may include human/machine interfaces (e.g., display screens, illuminated lights, audible alarms, and the like) that may be utilized in conjunction to inform a vehicle operator of the vehicle's current position and trajectory with respect to a target destination or region and information informing the operator of how to steer or otherwise maneuver the vehicle to the target destination.

In the present system and method, the offset (both in location and heading) for a vehicle from a target loading location can be determined according to the following algorithm. The algorithm could be executed, for example, by controllers operating on each vehicle or piece of equipment as described below. In one embodiment, portions of the algorithm may be executed by controller 2316 described above or any other controller or processor on the vehicle.

Figure 21:
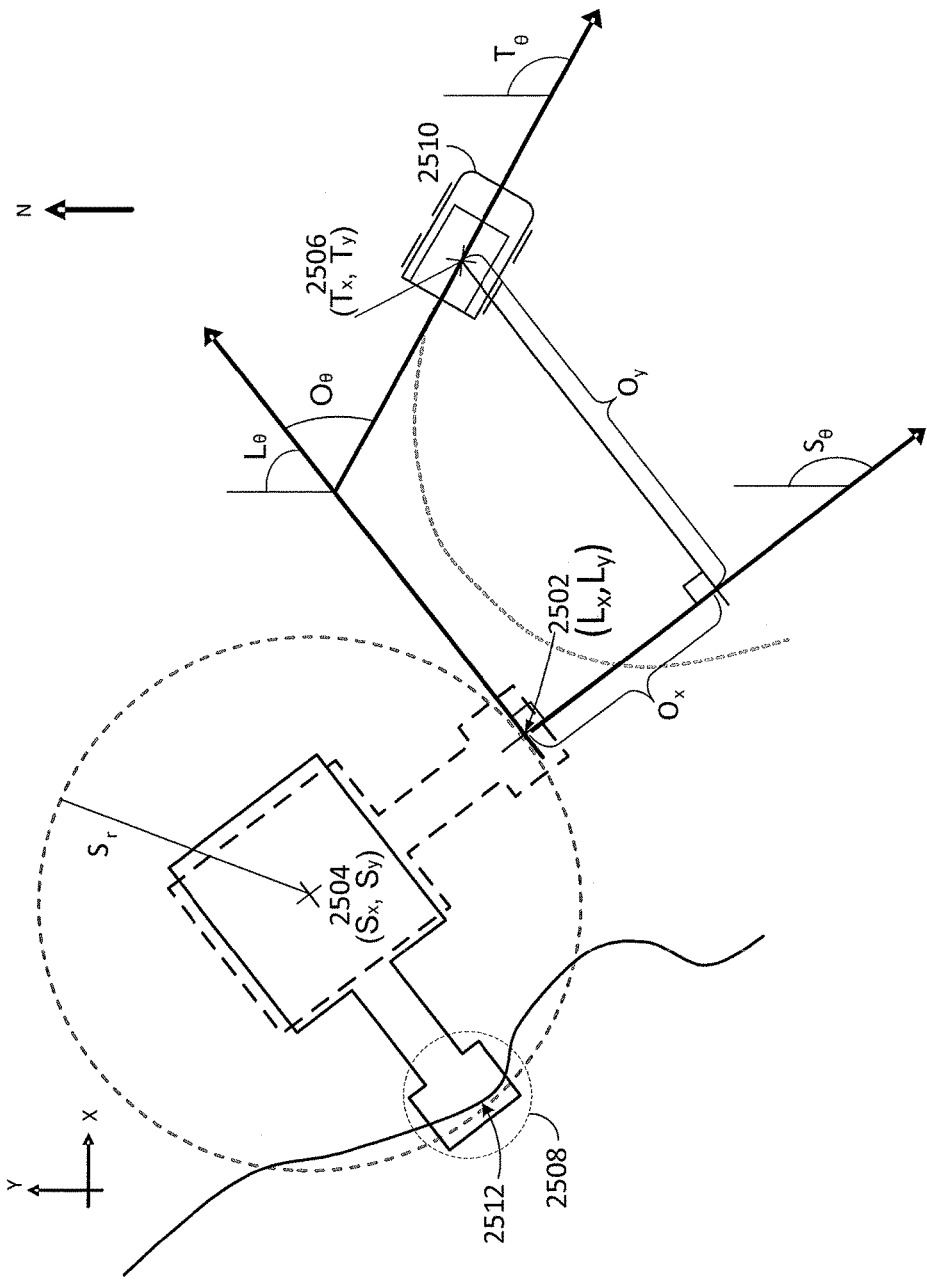
FIG. 21 is a schematic illustrating an offset of a vehicle from a target loading location.

FIG. 21 is a schematic illustrating an offset of a vehicle from a target loading location. A shovel operator of shovel 2504 positions the bucket or load 2508 at a desired load location 2502 and, using an appropriate human machine interface (HMI), sets that position as an active load location. The operator may set a right or left load location (or both), where the right location is clockwise from the dig point 2512 (when viewed from above), and the left location is counter-clockwise. In the example depicted in FIG. 21, the operator indicates a left location—load location 2502. The operator may also specify a desired loading radius or use a preconfigured value. The remote application records the shovel center pin position 2504 ($S_x$, $S_y$), heading $S_\theta$ (the orientation of the bucket 2508 relative to the North), and loading radius $S_r$. The location of the shovel could be determined using any suitable geolocation technology as described herein.

The coordinates ($L_x$, $L_y$) of the load location 2502 can be calculated as:

$$L_x = S_r \sin(S_\theta) + S_x \qquad (1),$$

$$L_y = S_r \cos(S_\theta) + S_y \qquad (2).$$

The heading $L_\theta$ (the orientation of the load relative to the North) of the load at load location 2502 is offset by 90 degrees from Se for right side load locations, and −90 degrees for left side locations:

$$L_\theta = S_\theta + 90 \text{ (right side) or } L_\theta = S_\theta - 90 \text{ (left side)} \qquad (3).$$

Then, vehicle offset positions are calculated. The vehicle offset position describe in terms of location and heading (e.g., orientation) how the vehicle is offset from load location 2502. A vehicle 2510 arrives at a position 2506 of coordinates ($T_x$, $T_y$) and heading $T_\theta$. Offset coordinates ($O_x$, $O_y$) ($O_x$ and $O_y$ can be referred to as lateral offset and longitudinal offset, respectively) and offset heading $O_\theta$ describe the vehicle's position and orientation in a coordinate system with its origin at the load location 2502 ($L_x$, $L_y$) and its vertical axis parallel to the load heading $L_\theta$.

The offset coordinates ($O_x$, $O_y$) can be calculated as:

$$O_x = (T_x - L_x)\cos(L_\theta) - (T_y - L_y)\sin(L_\theta) \qquad (4)$$

$$O_y = (T_x - L_x)\sin(L_\theta) + (T_y - L_y)\cos(L_\theta) \qquad (6)$$

The offset heading $O_\theta$ can be calculated as:

$$O_\theta = T_\theta - L_\theta \qquad (6)$$

Lastly, based on trigger criteria, coordinates ($O_x$, $O_y$) and heading $O_\theta$ are fed to a feedback mechanism. The feedback mechanism may link one or more of the offset variables to a visual or audio representation. For example, with reference to FIG. 16, horizontal lights 1606 and 1608 could represent lateral offset $O_x$, central ring 1610 could represent offset heading $O_\theta$. Longitudinal offset $O_y$ could be indicated using an audible beep.

While one or more embodiments of the present invention have been illustrated in detail, the skilled artisan will appreciate that modifications and adaptations to those embodiments may be made without department from the scope of the present invention as set forth in the following claims.

We claim:

1. A system, comprising:
   a position sensor configured to identify a location of a vehicle;
   an interface device configured to generate feedback; and
   a controller connected to the position sensor and the interface device, the controller being configured to:
   identify a destination for the vehicle,
   determine a location of the destination, the location of the destination being at least partially determined by a location of a shovel and a loading radius of the shovel,
   determine a heading of the destination, the heading of the destination being at least partially determined by an orientation of a bucket of the shovel when the bucket is positioned over the destination,
   compare the location of the vehicle to the location of the destination to determine a location difference,
   compare a heading of the vehicle to the heading of the destination to determine a heading offset, and
   generate feedback on the interface device, wherein the feedback is determined by the location difference and the heading offset.

2. The system of claim 1, wherein the interface device includes a plurality of lights and the controller is configured to illuminate a number of the plurality of lights based upon the location difference.

3. The system of claim 1, wherein the interface device includes a plurality of lights and the controller is configured to:
   determine a horizontal location offset by determining a difference between the location of the destination and the location of the vehicle in a direction perpendicular to a direction of travel of the vehicle; and
   illuminate a number of the plurality of lights based upon the horizontal location offset.

4. The system of claim 1, wherein the position sensor includes an electronic compass configured to determine the heading of the vehicle.

5. The system of claim 1, wherein the destination for the vehicle is a target loading location.

6. The system of claim 5, wherein the location and the heading of the destination for the vehicle are determined by an operator of a second vehicle.

7. A system, comprising:
   a position sensor configured to identify a position of a vehicle and a heading of the vehicle;
   an interface device configured to provide feedback to an operator of the vehicle; and
   a controller connected to the position sensor and the interface device, the controller being configured to:
   access a database to identify a target location for the vehicle,
   determine an orientation of a bucket of a shovel when the bucket is positioned over the target location,
   determine a location and a heading of the target location for the vehicle, the heading of the target location being at least partially determined by the orientation of the bucket of the shovel, and
   modify an output of the interface device to generate feedback to the operator of the vehicle based upon at least one of the location and the heading of the target location.

8. The system of claim 7, wherein the controller is configured to:
   compare the position of the vehicle to the location of the target location to determine a location offset; and
   modify the output of the interface device based upon the location offset.

9. The system of claim 8, wherein the controller is configured to:
   compare the heading of the vehicle to the heading of the target location to determine a heading offset, and
   modify the output of the interface device based upon the heading offset.

10. The system of claim 7, wherein the interface device includes a plurality of lights and the controller is configured to illuminate a number of the plurality of lights based upon the at least one of the location and the heading of the target location.

11. The system of claim 10, wherein the interface device includes a plurality of lights and the controller is configured to:
    determine a horizontal location offset by determining a difference between the location of the target location and the position of the vehicle in a direction perpendicular to the heading of the target location; and
    illuminate a number of the plurality of lights based upon the horizontal location offset.

12. The system of claim 7, wherein the position sensor includes an electronic compass configured to determine the heading of the vehicle.

13. A method, comprising:
    identifying a destination for a vehicle, the vehicle including a position sensor, the position sensor being configured to identify a location of the vehicle,
    determining a location of the destination for the vehicle, the location of the destination being at least partially determined by a location of a shovel and a loading radius of the shovel,
    determining a heading of the destination, the heading of the destination being at least partially determined by an orientation of a bucket of the shovel when the bucket is positioned over the destination,
    comparing the location of the vehicle to the location of the destination to determine a location difference,
    comparing a heading of the vehicle to the heading of the destination to determine a heading offset, and
    generating feedback on an interface device, wherein the feedback is at least partially determined by the location difference and the heading offset.

14. The method of claim 13, wherein the interface device includes a plurality of lights, and including illuminating a number of the plurality of lights based upon the location difference.

15. The method of claim 13, wherein the interface device includes a plurality of lights, and including:
    determining a horizontal location offset by calculating a difference between the location of the destination and the location of the vehicle in a direction perpendicular to a direction of vehicle travel; and
    illuminating a number of the plurality of lights based upon the horizontal location offset.

* * * * *